(12) United States Patent
Achlioptas

(10) Patent No.: US 8,489,570 B2
(45) Date of Patent: Jul. 16, 2013

(54) SYSTEM AND METHOD FOR EMPLOYING SOCIAL NETWORKS FOR INFORMATION DISCOVERY

(75) Inventor: Dimitris Achlioptas, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 376 days.

(21) Appl. No.: 12/344,877

(22) Filed: Dec. 29, 2008

(65) Prior Publication Data

US 2009/0112827 A1  Apr. 30, 2009

Related U.S. Application Data

(63) Continuation of application No. 10/353,623, filed on Jan. 29, 2003, now Pat. No. 7,472,110.

(51) Int. Cl.
*G06F 17/30* (2006.01)

(52) U.S. Cl.
USPC .......................................................... 707/706

(58) Field of Classification Search
USPC ........................ 707/1, 3, 9–10, 706; 705/7.29
See application file for complete search history.

(56) References Cited

U.S. PATENT DOCUMENTS

| | | | |
|---|---|---|---|
| 5,406,476 A * | 4/1995 | Deziel et al. | 705/7.15 |
| 6,115,709 A * | 9/2000 | Gilmour et al. | 705/7.29 |
| 6,269,369 B1 | 7/2001 | Robertson | |
| 6,366,956 B1 | 4/2002 | Krishnan | |
| 6,487,541 B1 | 11/2002 | Aggarwal et al. | |
| 6,493,702 B1 | 12/2002 | Adar et al. | |
| 6,582,475 B2 | 6/2003 | Graham et al. | |
| 6,594,673 B1 | 7/2003 | Smith et al. | |
| 6,681,108 B1 | 1/2004 | Terry et al. | |
| 6,714,916 B1 | 3/2004 | Robertson et al. | |
| 6,970,879 B1 * | 11/2005 | Gilmour | 340/691.6 |
| 7,024,404 B1 | 4/2006 | Gerasoulis et al. | |
| 7,031,952 B1 * | 4/2006 | Heumann et al. | 1/1 |
| 7,039,639 B2 | 5/2006 | Brezin et al. | |
| 7,177,880 B2 | 2/2007 | Ruvolo et al. | |
| 7,343,365 B2 | 3/2008 | Farnham et al. | |
| 7,539,697 B1 * | 5/2009 | Akella et al. | 1/1 |
| 8,060,492 B2 | 11/2011 | Nair et al. | |
| 2002/0054089 A1 | 5/2002 | Nicholas et al. | |
| 2002/0103792 A1 | 8/2002 | Blank et al. | |
| 2002/0122067 A1 | 9/2002 | Geigel et al. | |
| 2002/0169737 A1 | 11/2002 | Armstrong et al. | |
| 2002/0174144 A1 | 11/2002 | Wolpe | |
| 2002/0178161 A1 * | 11/2002 | Brezin et al. | 707/10 |

(Continued)

OTHER PUBLICATIONS

Henry Kautz, et al.; "Combining Social Networks and Collaborative Filtering", Communications of the AMC, Mar. 1997, pp. 63-65, vol. 40, No. 3.

(Continued)

*Primary Examiner* — Sheree Brown
(74) *Attorney, Agent, or Firm* — Lee & Hayes, PLLC

(57) ABSTRACT

Systems and methods are provided that enable searches of social networks by acting as a "compass" that assists users in navigating the social network. Individual user participation is not required in response to queries from other users. The systems and methods offer navigational assistance or information as opposed to a traditional search which returns requested information, thus currently acceptable social mechanisms for arbitrating trust can be exploited. As a result, users do not make their personal information publicly searchable, while at the same time, they are protected from potential misrepresentations of facts.

18 Claims, 16 Drawing Sheets

U.S. PATENT DOCUMENTS

| | | | |
|---|---|---|---|
| 2002/0194178 A1* | 12/2002 | Gilmour et al. | 707/9 |
| 2003/0014395 A1 | 1/2003 | Ruvolo et al. | |
| 2003/0030666 A1 | 2/2003 | Najmi et al. | |
| 2003/0038840 A1 | 2/2003 | Stern | |
| 2003/0061206 A1 | 3/2003 | Qian | |
| 2003/0158855 A1 | 8/2003 | Farnham et al. | |
| 2003/0167324 A1 | 9/2003 | Farnham et al. | |
| 2003/0169737 A1* | 9/2003 | Lavigne et al. | 370/392 |
| 2003/0210280 A1 | 11/2003 | Baker et al. | |
| 2004/0032393 A1 | 2/2004 | Brandenberg et al. | |
| 2004/0068477 A1* | 4/2004 | Gilmour et al. | 707/1 |
| 2004/0111386 A1* | 6/2004 | Goldberg et al. | 707/1 |
| 2004/0122803 A1* | 6/2004 | Dom et al. | 707/3 |
| 2004/0122855 A1 | 6/2004 | Ruvolo et al. | |
| 2005/0010451 A1 | 1/2005 | Marks et al. | |
| 2006/0085370 A1 | 4/2006 | Groat et al. | |
| 2006/0236249 A1 | 10/2006 | Weissman | |
| 2007/0016856 A1 | 1/2007 | Graham et al. | |
| 2010/0125604 A1 | 5/2010 | Martinez et al. | |
| 2010/0125605 A1 | 5/2010 | Nair et al. | |

OTHER PUBLICATIONS

Henry Kautz, et al.; "The Hidden Web", 1997, pp. 27-36.
Henry Kautz, et al.; "Creating Models of Real-World Communities with ReferralWeb", 1998.
Jon Kleinberg; "The Small-World Phenomenon: An Algorithmic Perspective", 2000, pp. 1-14.
M. E. J. Newman; "Small Worlds: The Structure of Social Networks", 2000, pp. 1-8.
John Schneider, et al.; "Disseminating Trust Information in Wearable Communities", 2000, pp. 1-5.
Alfarez Abdul-Rahman, et al.; "Supporting Trust in Virtual Communities", 2000.
David W. McDonald, et al.; "Just Talk to Me: A Field Study of Expertise Location", Nov. 14-18, 1998, pp. 1-10.
Keith N. Hampton, et al.; "Netville On-line and Off-line", American Behavioral Scientist, Nov. 1999, pp. 475-492, vol. 43, No. 3.
Emmanuel F. Koku, et al.; "Scholarly Networks as Learning Communities: The Case of TechNet", Jan. 2002, pp. 1-36.
Valdis Krebs; "The Social Life of Routers: Applying Knowledge of Human Networks to the Design of Computer Networks", The Internet Protocol Journal, Dec. 2000, pp. 15-25, vol. 3 , No. 4.
Final OA mailed Feb. 2, 2007 for U.S. Appl. No. 10/353,623, 22 pages.
Final OA mailed Nov. 9, 2005 for U.S. Appl. No. 10/353,623, 21 pages.
Final OA mailed Jan. 25, 2008 for U.S. Appl. No. 10/353,623, 24 pages.
OA mailed Feb. 22, 2005 for U.S. Appl. No. 10/353,623, 16 pages.
OA mailed Aug. 18, 2006 for U.S. Appl. No. 10/353,623, 16 pages.
OA mailed Jul. 31, 2007 for U.S. Appl. No. 10/353,623, 18 pages.
Final OA mailed Jan. 16, 2007 for U.S. Appl. No. 11/257,429, 12 pages.
Final OA mailed Jan. 9, 2008 for U.S. Appl. No. 11/257,429, 18 pages.
OA mailed Jul. 21, 2006 for U.S. Appl. No. 11/257,429, 12 pages.
OA mailed Jul. 19, 2007 for U.S. Appl. No. 11/257,429, 12 pages.
Final OA mailed Mar. 18, 2008 for U.S. Appl. No. 10/675,125, 33 pages.
Final OA mailed Dec. 10, 2008 for U.S. Appl. No. 10/675,125, 20 pages.
OA mailed Jun. 2, 2008 for U.S. Appl. No. 10/675,125, 34 pages.
OA mailed Sep. 14, 2007 for U.S. Appl. No. 10/675,125, 23 pages.
Office Action for U.S. Appl. No. 11/257,429, mailed on Apr. 18, 2012, Dimitris Achlioptas, "System and Method for Employing Social Networks for Information Discovery", 12 pgs.

* cited by examiner

| MEMBER NAME | FAMILIARITY | HERO | FAN |
|---|---|---|---|
| USER A | 2 | ☒ | ☐ |
| USER C | 10 | ☐ | ☒ |
| USER H | 5 | ☒ | ☒ |

FIG. 7

| LOCATION | CHICAGO |
| | ILLINOIS |
| HOBBIES | STAMP COLLECTING |
| | VIDEO GAMES |
| INTERESTS | ASTRONOMY |
| | SPORTS |
| | CLASSIC VEHICLES |
| ITEMS FOR SALE | RED CONVERTIBLE |
| ITEMS FOR TRADE | ABC VIDEO GAME |
| | XYZ VIDEO GAME |

FIG. 8

SYSTEM AND METHOD FOR EMPLOYING SOCIAL NETWORKS FOR INFORMATION DISCOVERY

CROSS-REFERENCE TO RELATED APPLICATIONS

This application is a continuation application of U.S. patent application Ser. No. 10/353,623, filed Jan. 29, 2003, and entitled, "SYSTEM AND METHOD FOR EMPLOYING SOCIAL NETWORKS FOR INFORMATION DISCOVERY", the entirety of which is incorporated herein by reference.

TECHNICAL FIELD

The present invention relates generally to information networks, and more particularly to employing social networks for information discovery.

BACKGROUND OF THE INVENTION

One of the most effective channels of disseminating and obtaining information is through direct, personal relationships referred to as social networks. A social network consists of individuals and their personal relationships to other individuals through which social information and opportunities are exchanged. The direct, personal relationship implies that two people "know" each other and typically have a certain amount of trust for each other. The value of social networks can be demonstrated for example by the "six degrees of separation" phenomenon, which means that the distance between any two individuals in terms of direct personal relationships is relatively small (e.g., 6 degrees or less). Social networks are frequently employed by individuals often without conscious thought. For example, a person may be searching for a job and contact his or her friends to determine if they are aware of available positions. These friends are able to provide reliable information about positions they themselves directly know about. Additionally, these friends can recommend their job-seeking friend for available positions, assuming they consider the job-seeking friend to be qualified, reliable, hard working and the like. Furthermore, these direct personal relationships can be employed to obtain social information and/or opportunities such as for example information about possible romantic partners, good movies, restaurants, buying, selling, buying or trading of items and services, recommendations for movies, restaurants, romantic partners and the like.

Direct personal relationships are particularly useful in obtaining information and opportunities because of the associated reliability of information and individuals involved. For example, an individual typically is more often willing to swap a vacation home (house-swap) with a friend of a friend, even though the individual may not personally know the friend of a friend, than to house-swap with a stranger. A basis for such trust is that the individual can trust that their immediate friend would not be associated with the person offering to house-swap (e.g., friend of the friend) were the friend of a friend not reliable or trustworthy. (Or, more generally, the immediate friend can be trusted to offer an honest assessment of the trustworthiness of the third party.) Social networks are often relied upon for opinion based information such as for example, movies, restaurants, travel locations and the like. Such information within a large number of the general populous is typically more relied on than well known restaurant and movie critics.

However valuable social networks are, they can be extremely difficult to utilize in that it can be time consuming for an individual to contact every person they have a relationship with when searching for information. Moreover, even if an individual could make the searching task easier for themselves, e.g. by creating a massive mailing list of their friends, addressing everyone in that list for each question is highly antisocial and certainly unsustainable as a collective behavior, i.e. if everyone does it. In general, such type of manual searching through a social network is impracticable for most individuals due in large part to the relative size of the individual's social network, time constraints, taxing of respective relationships within the social network (e.g., frequent requests for information can have a negative impact on a relationship), etc.

A number of approaches have been conventionally employed to obtain social opportunities and information from social networks. One approach that can be used is for a person to email everyone he or she knows (e.g., buddies) requesting information on a particular subject. This approach is not likely to be appreciated by individuals on the receiving end of the email, particularly if such approach is employed often; and could possibly damage personal relationships.

Another technique to utilizing social information from social networks is to have individuals create a "home page" about themselves in which they describe particular attributes by which they want to be referred to, such as place of birth, high-school attended, occupation, areas of expertise, interests, hobbies, plans for the summer and the like. These pages can be associated with a search engine—then, in response to a person with certain attributes, the requested information, possibly including contact information, is returned. This approach fails for a number of reasons. Referrals often rely on information that individuals do not wish to be make publicly searchable. For example, typically individuals prefer not to have strangers and telemarketers be able to determine what their friends know about them, such as their hobbies and favorite vacation spots. Additionally, people identified through such a search can be strangers and unreliable. For example, a search for someone to carpool with may return an individual with a matching work schedule, but that individual could be difficult to get along with.

Thus, social networks and their direct personal relationships include a tremendous amount of latent information and opportunities. However, conventional approaches for discovering these latent features fail to properly utilize social networks in that they:

i) overtax personal relationships and cause information overload; and/or ii) are inadequate for maintaining a sufficient level of individual privacy.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methodologies that facilitate maintaining privacy of personal information within public database search environments. The invention also can facilitate conducting general queries of databases for purposes of locating personal attribute information of an unknown person, and allow an originator of a query to evaluate a level of trust associated with an individual identified by a query. Moreover, the invention has an effect of providing for a private database that is publicly searchable in part due to masking properties (e.g., not associating query results with direct exposure of individuals that may be part of the query results) of the present invention.

The present invention leverages efficiencies and processing power associated with modern computing systems so as to expand a scope of human social networks beyond what is conventionally practicable with respect to solely human-based social networking. In other words, the subject invention provides a computer based search system/methodology that maps or models human social networks and exposes untapped social opportunities (e.g., connecting individuals) at a scale and granularity not achievable by conventional search systems or solely human-based social networking. In other words, the present invention employs computing systems to facilitate navigation through human social networks for the discovery of social opportunities.

One particular aspect of the invention relies in part upon an individual's willingness to truthfully state, but not necessarily publish or advertise, personal attributes (e.g., experience, occupation, interests, hobbies, historical information, . . . ), and other individual(s) that can verify validity of the published attributes. For example, a query from an individual (e.g., person A) in accordance with one particular aspect of the invention identifies a suitable match of individuals (e.g., people B, C, D) that claim to have specific attributes sought after, and at least one other individual (e.g., individual E) that can verify existence of the desired attribute. Individual E is identified by connections of for example "a friend of a friend" that map back to someone that individual A knows and trusts in a social network environment.

In accordance with another aspect of the subject invention, human social networks are abstracted into a searchable database populated with information related to individuals that make up the respective social networks. A search engine receives a query, and an analysis is performed based in part on the query, the source (e.g., individual) making the query, and information, people and entities related to the query within the database. A mapping is performed to determine a desirable or optimal path from the individual making the query to a person having information related to what is sought after via the query. The path can, but is not required to be the shortest path from the individual to the person having the information. The search engine exposes at least a portion of the path to the individual making the query so as to lead the source of the query in the proper direction but also maintaining trust integrity associated with the social network. Thus, if there is a node (e.g., individual) in the path that does not wish to expose the individual making the query to another node in the path for any of a number of reasons, the individual making the query is prevented from contacting (e.g., being exposed) to the other node. Such aspect of the invention has a firewall effect wherein respective individuals/friends (e.g., designees) along a given path serve as gatekeepers of privacy to individuals/friends downstream in the path. Accordingly, a powerful human-based trust mechanism is employed in connection with modern day computing systems to provide a powerful and reliable means for navigation through a human social network.

Thus the subject invention provides for systems and methods that enable searches of social networks by acting as a "compass" that assists users in navigating a social network. Individual user participation is not required in response to queries from other users. The systems and methods of the subject invention offer navigational assistance or information as opposed to a traditional search which returns requested information, thus currently acceptable social mechanisms for arbitrating trust can be exploited. As a result, users do not make their personal information publicly searchable, while at the same time, they are protected from potential misrepresentations of facts.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 7 illustrates an exemplary interface for entering a buddy list according to an aspect of the invention.

FIG. 8 illustrates an exemplary entry of personal information according to an aspect of the invention.

DETAILED DESCRIPTION OF THE INVENTION

Figure 1:
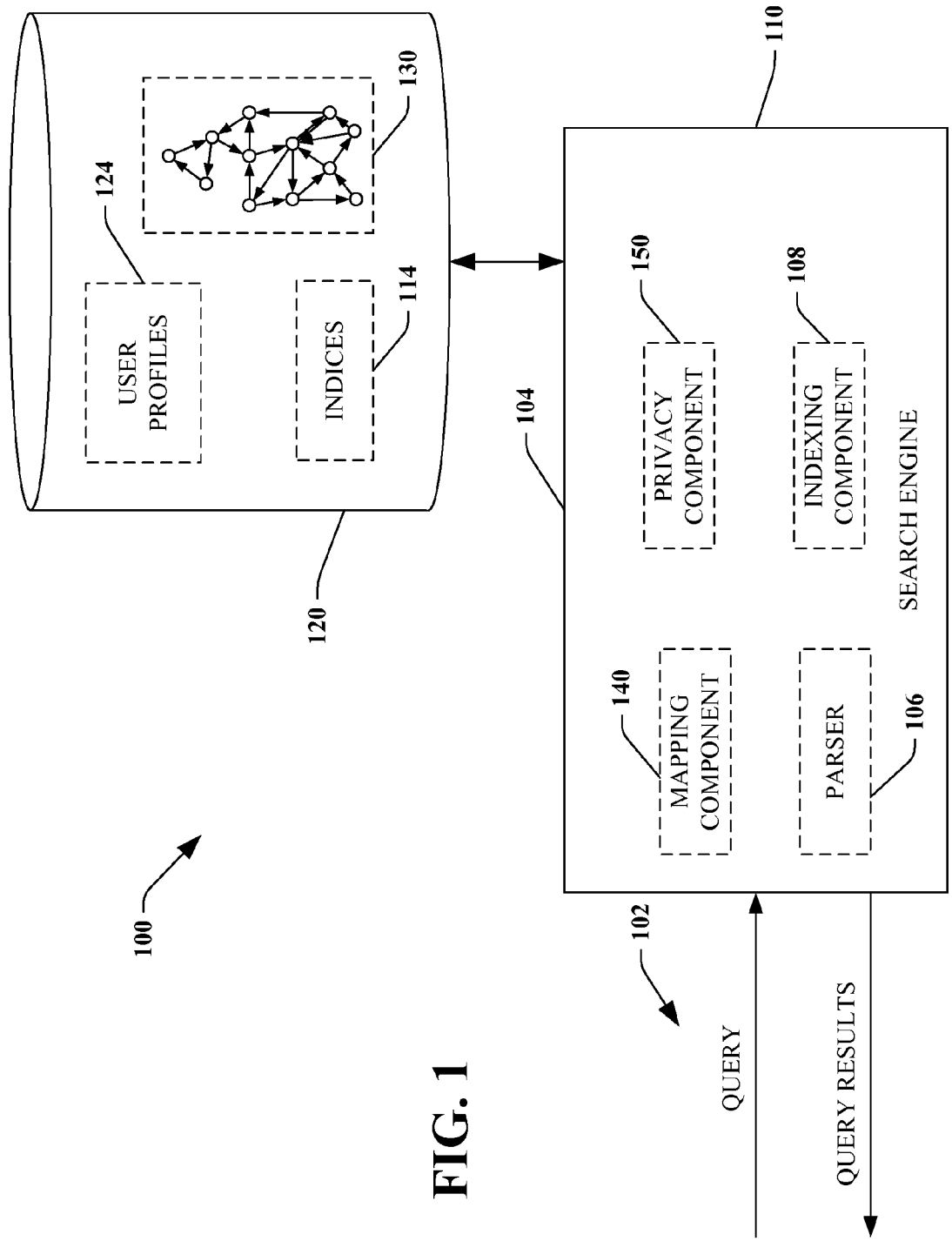
FIG. 1 is a block diagram illustrating a system for utilizing social information according to an aspect of the invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

FIG. 1 schematically illustrates at a high-level a social networking system 100 in accordance with the present invention. The system facilitates maintaining privacy of personal information within a database search environment, and also can facilitate conducting queries of databases for purposes of locating personal attribute information of an unknown person, and allow an originator of a query to evaluate a level of trust associated with an individual identified by a query.

In accordance with the system 100, a query 102 (e.g., natural language based query) is received by a search engine 104, which processes in part the query 102. For example, the query can be natural language based—natural language is structured so as to match a user's natural pattern of speech. Of course, it is to be appreciated that the subject invention is applicable to many suitable types of querying schemes. The search engine 104 includes a parser 106 that parses the query into terms germane to the query and employs these terms in connection with executing an intelligible search coincident with the query 102. The parser 106 can break down the query into fundamental indexable elements or atomic pairs, for example. An indexing component 108 sorts the atomic pairs (e.g., word order and/or location order) and interacts with indices 114 of searchable subject matter and terms in order to facilitate searching. Additionally, the query 102 generally includes a query distance, which defines a distance from an originator of the query (e.g., individual, entity) to which the search is limited.

The system 100 further includes a storage 120 that stores a variety of data such as for example, user/entity profiles 124, indices 114, and a directed graph 130 of a social network. The profiles 124 contain attributes of individuals or entities associated with a social network in accordance with the present invention. The respective profiles can vary as to quantity as well as quality and type of attribute information. In accordance with one aspect of the invention, the profile information is directly input via each respective individual or entity. However, it is to be appreciated that any of a variety of information gathering schemes and sub-schemes (e.g., data mining, cookies, data scavenging, 3rd party providers . . . ) could be employed in connection with the subject invention if desired. The directed graph 130 is a large collection of information relating to individuals and relationships between those individuals. The directed graph 130 although pictorially depicted as a graph of vertices and arcs can take many data-structure type forms (e.g., table, relational databases, XML based databases), and functionally represents intra-relationships between subsets of individuals and/or entities within the social network. The directed graph 130 is discussed in greater detail below with respect to FIG. 2.

The search engine 110 thus receives the query 102 and via employment of the parser 106, indexing component 108, profiles 124, indices 114 and social network database 130 determines final node(s) (e.g., individual(s) or entity(s)) having information corresponding to the query 102, and also determines most efficient paths from the source of the query to the final node(s). The search engine 110 employs a mapping component 140 in connection with mapping relevant paths from the source of the query to the final node(s). The search engine 110 also comprises a privacy component 150 that facilitates determining a degree of exposure of path portions to the source. One particular security implementation (e.g., babushka concept) is discussed infra in connection with the discussion relating to FIG. 14. The privacy component 150 can selectively expose and shield data in connection with the search in order to maintain privacy and trusts in accordance with the subject invention. For example, there may be three nodes (B, C, D) within a path from source A to destination E; and the privacy component may only expose node B to source A as part of a query result. Node B can decide whether or not to expose source A to a downstream node (e.g., Node C) in the path, and likewise if applicable Node C can perform the same sort of exposure analysis with respect to exposing Node D. Thus, the privacy component 150 facilitates maintaining privacy and trusts associated with respective nodes and intra-relationships of those nodes.

It is appreciated that the query 102 can be permitted or denied by the system 100. The system 100 can track user performance and behavior (e.g., how many queries submitted versus how many answered). Then, based on that behavior, the system 100 can decide whether to permit or deny requests from that user. By so doing, a degree of fairness can be enforced by requiring users to positively contribute and not just place numerous queries.

Figure 2:
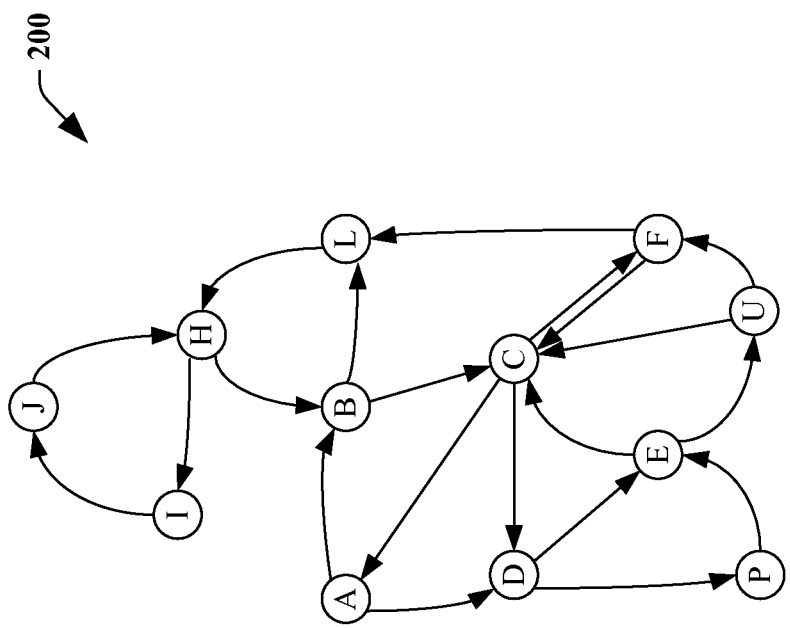
FIG. 2 illustrates a directed graph of a social network according to an aspect of the invention.

FIG. 2 illustrates the directed graph 130 of a social network according to an aspect of the invention. As noted above, the social network database 120 (FIG. 1) stores information relating to social network(s). The directed graph 130 corresponds to a subset of at least one of a plurality of the social networks that have corresponding information stored in the social network database 120. The depicted directed graph 130 is simplified for illustrative purposes only and illustrates some typical relationships between people in a social network. It is appreciated that a social network (e.g., embodied as a directed graph) employed in accordance with the present invention can have any suitable number of vertices (persons) and arcs (relationships). With the graph 130 individuals and/or entities in a particular social network are represented by vertices (e.g., nodes), and a relationship between two vertices are represented via an arc connecting the vertices. The vertices can be annotated with information (e.g., attributes) about the individual or entity represented by the vertex. It is to be appreciated that two or more arcs can be employed with respect to two vertices. More particularly, a unidirectional relationship between a first vertex with respect to a second vertex can be represented by a first arc, and a unidirectional relationship between the second vertex with respect to the first vertex can be represented via a second arc. Moreover, it is to be appreciated that additional arcs could be employed wherein respective arcs can represent unique subsets corresponding to relationships.

With respect to FIG. 2, a brief example with respect to logic associated with a one particular aspect of a directed graph is now described with respect to individual A and individual B having a relationship. An arc points from individual A to individual B indicating that A is familiar with B (e.g., A considers B to be his or her "buddy")—the notion of familiarity is described in detail infra with respect to FIG. 4 and thereafter. Because of their relationship, individual A is typically willing to provide personal information to individual B that he/she would not, necessarily, want made public or even want others to view. Individuals B, C and D comprise a list or buddy list of individual A, implying that A has a personal relationship with B, C and D. The relationship of A with respect to B, C and D is illustrated by arcs connecting A to B, C and D. The directionality of the arcs indicate that A contacts B and D for information and is contacted by C for information. Individuals C and F are depicted via two arcs as having a common pair of relationships, wherein each individual (C and F) considers the other a buddy or friend, and is willing to contact each other for information and is willing to provide information to each other—as noted supra, this pair of relationships can also be referred to as a bi-directional relationship. It is to be appreciated that any of a number of suitable algorithms, programs and/or relational database schemes to effect the functionality associated with the directed graph 130 can be employed and are intended to fall within the scope of the hereto appended claims. It is to be appreciated that individuals can have respectively differing values (e.g., views) with respect to each relationship, and the subject invention contemplates reconciling such differing values (e.g., to mitigate a user from abusing a system employing the invention for example via spamming individuals by declaring a familiarity therewith). (See infra discussion relating to FIG. 4 and thereafter).

Figure 3:
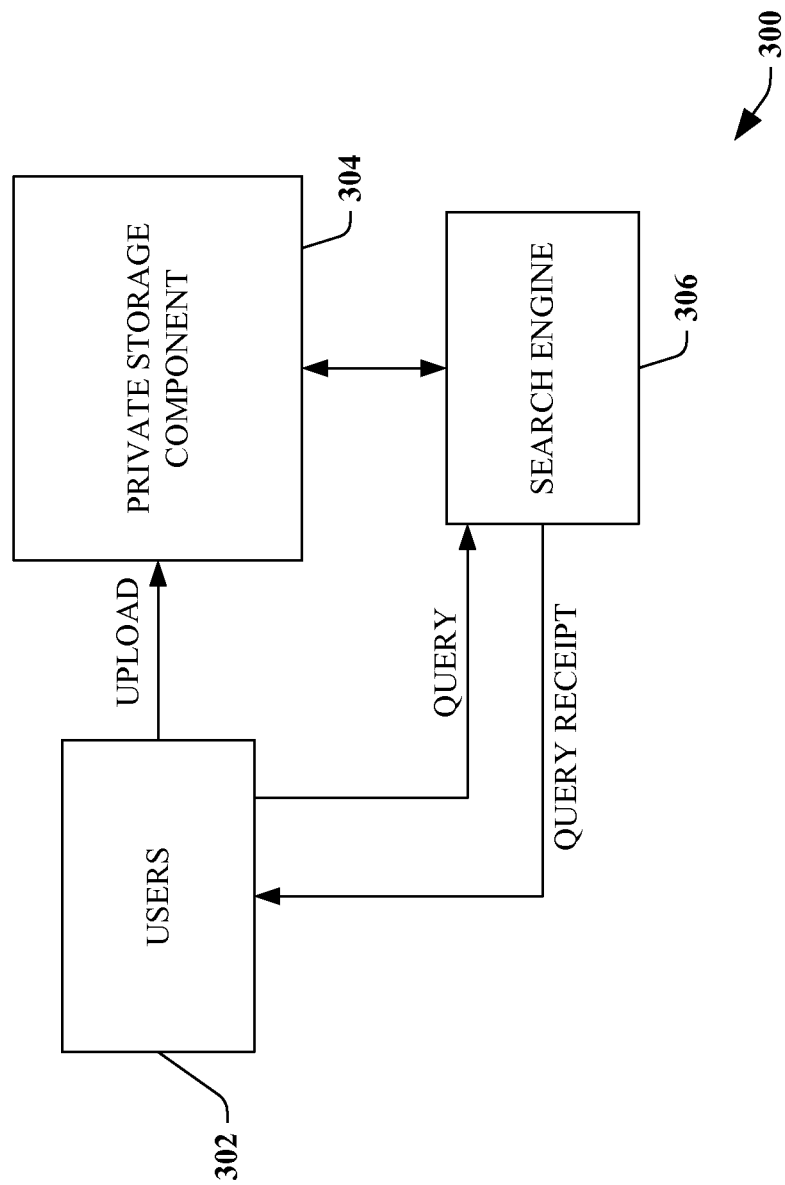
FIG. 3 is a block diagram illustrating a system for utilizing social information according to an aspect of the invention.

Turning now to FIG. 3, a specific embodiment of the subject invention is described in detail. A system 300 that utilizes social information according to an aspect of the invention is depicted. The system 300 comprises a set of users 302, a private storage component 304 and a search engine 306. The system 300 acts as a compass to facilitate guiding users toward reliable social information and opportunities whilst maintaining privacy of the set of users 302. The system 300 generates a social network, maintains the social network and provides navigation information based on the social network.

Although, the present invention describes the system 300 in primarily a monolithic sense, it is to be appreciated that after the social network is populated, the social network can become part of a distributed network wherein individual computing system(s) can maintain and employ the social network. Moreover, as the social network changes the system can prompt the individual computing system(s) to receive an updated version of the social network.

Additionally, the social network once populated can be employed by 3rd party services (e.g., on-line auction sites) to employ the social network in connection with a social or business purpose coincident with the 3rd party's service. Furthermore, the system 300 can package the social network and distribute it in its entirety or in a modified version to a plurality of 3rd parties for independent use.

Returning to FIG. 3, the set of users 302 are a number of persons that desire or choose to be a member of the social network, generally, the number is relatively large. Respective users full out a "buddy list", which is a list of people they are willing to be contacted by for information and/or to which they are willing to contact for information. Furthermore, the buddy list is a list of people with whom a user has a direct personal relationship and an amount of familiarity. Additionally, the members of the buddy list are typically willing to corroborate information of the respective users. Then, after entering buddy lists, respective users directly enter personal information referred to as profiles, about themselves by utilizing predefined semantic categories and predefined attributes. The categories and predefined attributes permit consistency in the personal information and improve the efficiency of entering in personal information for the set of users 302. Typically, the categories and predefined attributes are set with default and/or typical values to further ease the personal information entering process. As an example, a hobby of computers can be pre-selected because it is likely to be true for a large number of the set of users 302. Additionally, previously known information about respective users can be employed to set predefined categories and attributes. Thus, for example, cookie information for a particular user can indicate that that user frequently visits photography based web sites, thus suggesting that the user has a hobby of photography. As another example, merely having a user's age can provide a number of likely entries of personal information. Other information gathering schemes and sub-schemes (e.g., data mining, cookies, data scavenging, third party providers and the like) can be employed in connection with the subject invention if so desired. It is to be appreciated that profile related information can be populated in a "context-sensitive" manner. Accordingly, subsets of a profile can be employed with respect to a particular application and/or state. Moreover, separate profiles can be created for specific applications and/or states. For example, an individual logging onto a shopping related site could be associated with a unique persona with profile information relating to the persona being provided by the site. Furthermore, it is to be appreciated that a first entity can generate a profile and provide to other parties the profile and/or subset(s) thereof and/or modified versions thereof so as to be employed in application specific and/or in a context-sensitive manner.

It is appreciated that different users can provide or not provide varying amounts of information within their personal information. Thus, users are permitted to enter as much or as little personal information as they choose. After the personal information is entered, the buddy lists and personal information are uploaded to the private storage component 304, which stores and maintains the information. Additionally, respective users are able to modify and/or update their buddy lists and their personal information and again upload that information to the private storage component 304 wherein their previous information is then overwritten. Similarly, respective users are able to remove themselves and/or their information from the private storage component 304.

One suitable approach to entering the personal information or attributes is to ask respective users to write a "home page" about themselves utilizing the categories and predefined attributes. The respective users could obtain a generic page or template of a home page and then enter their personal information. A number of attributes should be selectable to increase the ease of entering the personal information. For example, a user may be able to select an item from a drop down list for a particular attribute. As another example, a user may be able to select "not applicable" for attributes that user does not wish to provide information for. Then, the home pages can be uploaded to the private storage component 304 via a secure connection that reasonably ensures that their personal information does not become public information. Other suitable approaches can be used to upload personal information and still be in accordance with the present invention.

Another approach to obtaining personal information or attributes is to employ a mechanism that interacts with web browsers. The mechanism provides one or more buttons via a user interface. The one or more buttons can the be utilized to selectively perform functions such as, adding current web page to hobbies, adding current web page to research interests, adding current web page to favorite bands and the like.

As stated above, the private storage component 304 receives the personal information and buddy lists from the set of users 302 and securely stores and maintains this information. The private storage component can organize and/or index the personal information to increase searchability of the information. Then, the private storage component 304 generates a directed graph utilizing vertices for respective users and arcs from respective users to members of their buddy list that are in the set of users 302. The directed graph is a large collection of information (e.g., attributes) relating to the users 302 and relationships between the users 302. It is appreciated that at least some members of a user's buddy list can be absent from the set of users and, therefore the directed graph. The directed graph is typically depicted as a graph of vertices (e.g., nodes) and arcs. However, the directed graph can take other suitable data-structure type forms (e.g., table, relational databases, XML based databases). The directed graph, generated by the private storage component 304, can resemble the directed graph illustrated with respect to FIG. 2, and described above. The private storage component 304 is typically implemented at a central location, yet accessible by a large number of the set of users 302. Suitable encryption techniques can be used to properly encrypt the personal information and the graph.

The search engine 306 is operative to receive queries from the set of users 302 and return query receipts to the set of users 302. The queries are parsed into terms germane to the queries to facilitate searching. For a respective query, the search engine 306 then accesses the directed graph stored in the private storage component 304 and obtains appropriate or desired information. The desired information is then processed to generate a query receipt. A typical query includes information such as, a user requesting the query, an attribute and/or information requested and a query distance. The query distance or query degree is the number of arcs or vertices to which the query can extend to from the user to search for the information. After parsing the query, the search is generally performed employing a breadth first search of the directed graph starting at the vertex of the user requesting the query. On finding a match of the requested information, a query receipt is generated and returned to the user. The query receipt includes a referral path to the requested information, but can be encrypted or protected such that the user can only view a first person in the referral path to the requested information, for example. The query receipt can be in any number of suitable formats, such as, for example, an encrypted data packet, an encrypted data packet utilizing private keys, a password protected hyperlink and the like. The user can then contact the first person on the referral path with the query receipt and it is up to that first person to assist in obtaining the requested information. The first person is able to view the next person the referral path to the requested information. One can think of the entire path corresponding to the answer as taking the form of a virtual babooshka. The first user, making the query, can see what is the person they should talk to. They then forward the babooshka to that person, who equipped with a unique key, can "remove" the outer doll and see who is the person they should contact and so on.

For example, utilizing the directed graph of FIG. 2, user U requests a query for information with a query distance of 1. It can be seen from the directed graph of FIG. 2 that a buddy list of U comprises users C and F. The personal information of users C and F are searched for U's requested information. If neither C nor F has the requested information, a query receipt is returned with a "not found" message. If C or F does have the requested information, a query receipt is returned identifying a referral path to the requested information, but not the requested information. The user U can then contact the first user in the referral path to request the information. In some aspects of the invention, the user U can obtain or access the requested information because the user(s) is in their buddy list and within one degree or distance from the user. As another example, again utilizing the directed graph of FIG. 2, user U requests a query for information with a query distance of 3. As described above, C and F are searched for the requested information. However, the users in C's buddy list and F's buddy list are also searched. From FIG. 2, it can be seen that C's buddy list includes users A, D and F and that F's buddy list includes C and L. Because the query distance is 3, the buddy lists of A, D, C and L are also searched for the information. It can be seen that A's buddy list include B and D, D's buddy list includes P and E, C's buddy list includes A, D and F, and L's buddy list includes H. Thus, P, E and H are also searched for the requested information. For this example, assume that user P has the requested information. A query receipt is returned to user U identifying the user in U's buddy list on the referral path towards user P. The query receipt would, for this example, identify C as the person towards whom U should seek the requested information. As before, the query receipt does not return the requested information. U can then contact user C with the query receipt. Typically, user U can simply email the query receipt to C. Here, C is unable to provide the requested information and is only provided with the next user in the referral path to user P, user D. C. can also contact user D with the query receipt. Alternately, C can simply refuse to assist U and U is then unable to obtain the requested information. Like user C, user D also does not have the information. But, user D is aware, from the query receipt, that user P may have the information. As with user C, user D can simply refuse to assist user C. D then contacts user P with the query receipt. P is then able to provide or deny the information. P can then provide (e.g., via instant messaging or email) the requested information to user D, who then can provide the requested information to user C who can then, provide the requested information to user U. The requested information can be encoded so that only user U is able to obtain it. In other aspects of the invention, user P can directly contact user U, which is particularly helpful if the requested information is, for example, someone in a particular city.

It is to be appreciated that various policing mechanisms can be employed if desired to regulate use of the present invention. For example, an individual may be required to participate in serving as part of path(s) for various queries in order to make a particular number of queries. Moreover, such mechanism can be effected at a more granular level wherein if node A makes requests of node B x number of times, node A must assist node B in connection with x number of requests from Node B.

Figure 4:
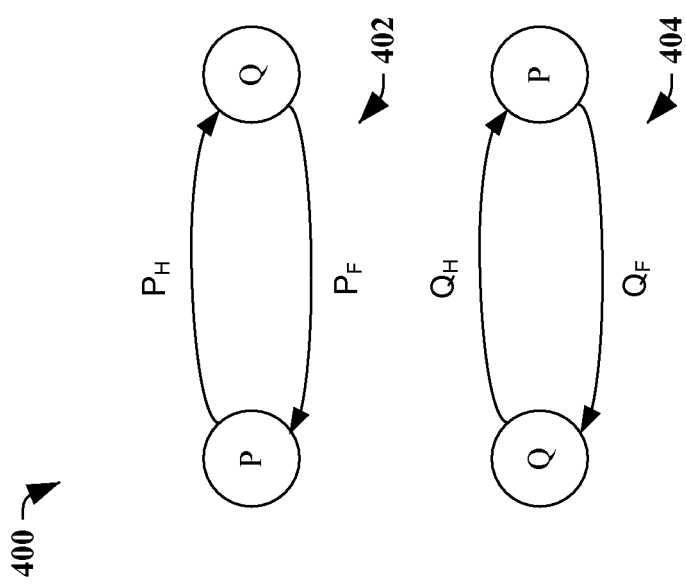
FIG. 4 illustrates a pair of users in a social network according to another aspect of the invention.

FIG. 4 illustrates a diagram 400 of relationships for a pair of users in a social network according to another aspect of the invention. A first view 402 of the relationships that a user P has with another user Q and a second view 404 of the relationships that the user Q has with the user P are depicted. Thus, in effect, between any two nodes fours arcs exists (e.g., one pair of arcs relating to perceptions of the relationship from each nodes point of view, and the other pair relating to an actual respective view of the node(s) relationship). Accordingly, reconciliation can be performed so as to converge to a lowest value between respective arcs. As is readily apparent, such reconciliation can serve as a fundamental mechanism against employing the subject invention in connection with spam since data is passed based on a value that is representative of the true relationship between nodes as compared to a perceived notion regarding the relationship. The relationships between users can be defined by familiarity—thus, according to the user P, P has a familiarity with another user Q as indicated by PH and PF and Q has a familiarity with P as indicated by QH and QF. Familiarity values can have a number of levels or values wherein higher values or levels indicate greater degrees of familiarity. For example, P can have a familiarity with Q wherein the familiarity is "very familiar" meaning that user P would not hesitate to contact user Q, even for relatively minor matters or information (e.g., PH). This "very familiar" level is denoted by assigning a relatively large value to the arc PH. Likewise, assigning a relatively low value to the arc PH indicates that P is merely "somewhat familiar" with Q and that P would hesitate to contact Q. The familiarity is assigned a value within a predetermined range with highest values corresponding to highest degrees of familiarity. Additionally, the user P assigns a familiarity value PF which indicates a willingness to be contacted by Q for information. Similarly, the user Q also assigns familiarity values QH and QF. However, it is appreciated that familiarity is an asymmetric notion, thus, for example, the familiarity assigned to PH can be different than the familiarity assigned to QF. For example, user P can consider himself to be very familiar with Q whereas user Q can consider himself to be only somewhat familiar with user P. Such differences can be reconciled via a number of suitable approaches. One such approach is to initially assign familiarity values as 0 and to block interaction between two users unless both have assigned familiarity values greater than zero to the same relationship. Additionally, a final value of the relationship can be determined by mitigating one user's assignment with the others (e.g., by assigning the arc from P to Q with the minimum of QF and PH).

A buddy list has been described above as a list of people or users that a given user has a direct relationship and an associated familiarity with. However, these relationships can be defined with more than the associated familiarity because relationships can be more complex. Some relationships are "unidirectional" implying that an individual or user can ask another for information, but that other person does not ask the individual or user for information. As an example, a student can contact a teacher for information but the teacher does not, typically, contact the student for information. Thus, the buddy list can be divided into two non-disjoint groups or categories, fans and heroes such that members can be fans and heroes simultaneously. Each member (buddy) in the buddy list is also assigned a familiarity or degree of familiarity. The term "fans" is defined to include members (buddies) that have at least the following two properties; the user perceives value in helping these members find information and the user trusts these members' judgment regarding when it is appropriate to contact the user. Thus, assigning a high familiarity to a "fan" implies that the fan can contact the user substantially any time. The term "heroes" is defined to include members (buddies) that have at least the following property; the user is willing to contact these members for information. Similarly, assigning a high value to a "hero" implies that the user can call the hero at substantially any time.

Figure 5:
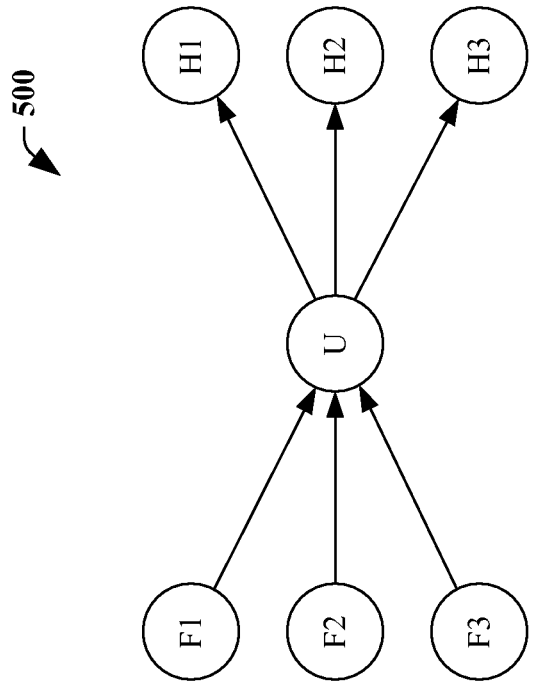
FIG. 5 illustrates a user's buddy list according to an aspect of the invention.

Thus, FIG. 5 illustrates a respective user of a social network and that user's buddy list according to an aspect of the invention. The user (U) is illustrated having three fans (F1, F2 and F3) that can contact U for information. The user (U) is also illustrated having three heroes (H1, H2 and H3) that U contacts for information. It is appreciated that at least some fans can be heroes and that at least some heroes can also be fans. It is further appreciated that a user in a social network according to the present invention is not limited to a particular number of fans, heroes and members of a buddy list. FIG. 5 merely illustrates three fans and three heroes for illustrative purposes only.

Figure 6:
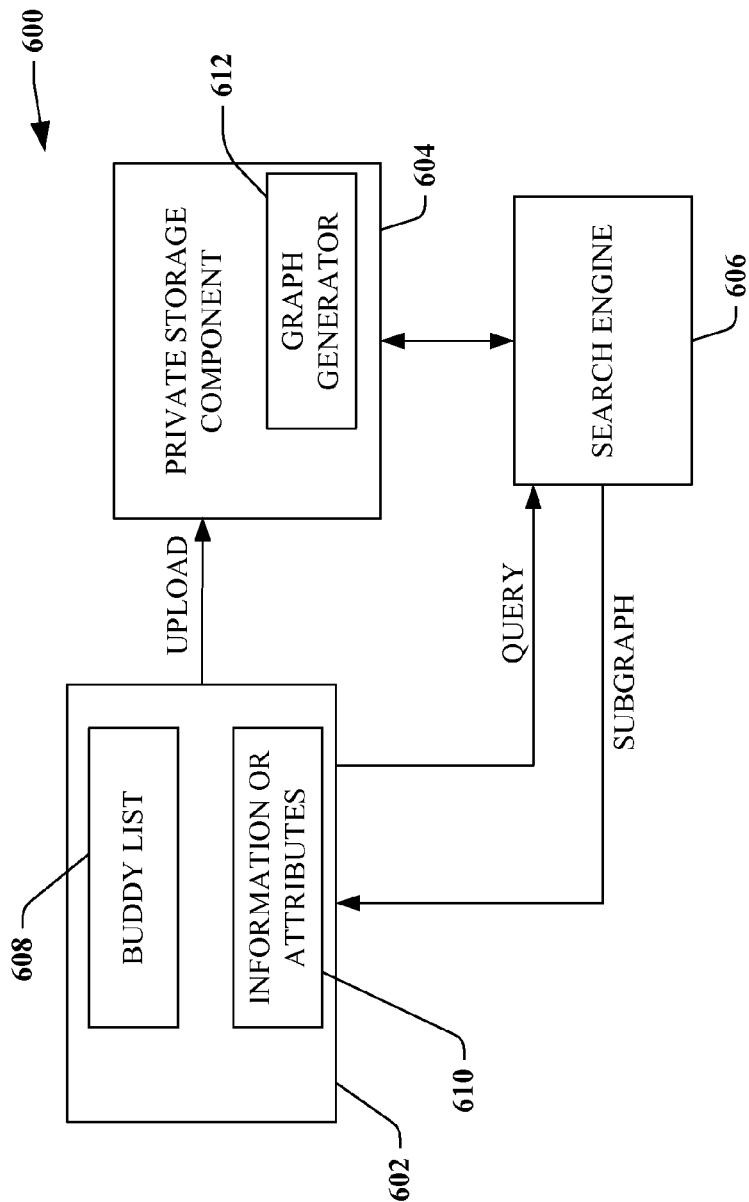
FIG. 6 is a block diagram illustrating a system for utilizing social information according to an aspect of the invention.

FIG. 6 is a block diagram depicting a system 600 for utilizing social information according to an aspect of the invention. The system 600 comprises a set of users 602, a private storage component 604 and a search engine 606. The system 600 acts as a compass to guide users toward reliable social information and opportunities whilst maintaining privacy of the set of users 602. The system 600 generates a social network (via a graph), maintains the social network and provides navigation information based on the social network.

The set of users 602 are a number of persons or users that are members of the social network. Generally, the number of users in the system 600 is relatively large. Respective users full out a "buddy list", which is a list of people they are willing to share their information with and/or to whom they are willing to permit access to their information. For respective members (e.g., buddies) of the buddy list 608, users enter or provide a name, familiarity or degree of familiarity with the member and indicate whether the member is a fan, a hero or both. The name can be a full name or a username. The familiarity has a range of possible values (e.g., 1 to 10 or 1 to 100) where, typically, a higher number indicates a greater degree of familiarity. The member is indicated as a hero if the user is willing to contact this member for information, a fan if the user is willing to be contacted by this member for information or both if the user is willing to contact and to be contacted by this member. Additionally, a fan should be willing to corroborate personal information entered by the user although this is not necessarily valid.

It is appreciated that people can have differing views on their personal relationships. Thus, a user can view a member of the user's buddy list 608 as being a hero with a high degree of familiarity but that member can view that user as being unfamiliar and not a fan and can fail to include that user on the member's own buddy list. Thus, entry of a buddy list does not generally require checking and/or verification to determine if, for example, other users agree.

FIG. 7 schematically illustrates an exemplary interface 700 for entering a buddy list 508 according to an aspect of the present invention. The interface 700 can be employed with the system 600 in FIG. 6, for example. The interface 700 permits an entry for respective members of a user's buddy list and includes a member name, familiarity, hero indication and fan indication. The member name typically corresponds to another user of the system 600 but can be, for example, a person who is not currently a member or user of the system 600. The familiarity indicates a degree or an amount of familiarity that a user has with a member of the user's buddy list. The familiarity is a range of values and is illustrated as a range of 1 to 10, with 10 indicating the most familiar. The interface 700 can employ a drop down list to allow a user to easily select the familiarity. The hero and fan indicate whether the user considers this particular member to be a hero, fan or both. The interface 700 can employ a checkbox to permit a user to easily select the hero and/or fan indicators. FIG. 7 depicts members A, B and C of a buddy list. The user has a low familiarity with A (2) and considers A to be a hero. The user has a high familiarity with B (10) but only considers B to be a fan. The user has an average familiarity with C (5) and considers C to be a fan and a hero.

Then, respective users enter personal information about themselves, referred to as profiles. The profiles are generally entered utilizing predefined categories and attributes, which permit consistency in the personal information for the set of users 602. However, it is to be appreciated that any suitable scheme in accordance with the subject invention for profile-creation is contemplated and intended to fall within the scope of the hereto appended claims. Additionally, the categories and predefined attributes can be set with default or typical values to ease the personal information entering process. It is appreciated that different users can provide or not provide varying amounts of information within their personal information. Thus, users are permitted to enter as much or as little personal information as they prefer.

FIG. 8 illustrates a typical exemplary entry 800 of personal information in accordance with the present invention. Several categories 802 and one or more attributes 704 for the respective categories are depicted. Thus, for example, navigation information towards this user can be returned based on a query for a red convertible for sale. One suitable approach for entering the personal information or profile employs a generic page or template of a home page that assists entering such information. As discussed in greater detail infra, creating a home page can amount to making statements about oneself that a 3rd party (e.g., fan) would not mind corroborating. A number of attributes should be selectable to increase the ease of entering the personal information. For example, a user may be able to select an item from a drop down list for a particular attribute. As another example, a user may be able to select "not applicable" for attributes that a user does not wish to provide information for. Then, the home pages can be uploaded to the private storage component 604 (FIG. 6) via a secure connection that reasonably ensures that their personal information does not become public information. Other suitable approaches can be used to upload personal information (e.g., data mining, cookies, data scavenging, third party providers and the like) and still be in accordance with the present invention.

Returning to FIG. 6, after the personal information 610 and buddy lists 608 are entered for the set of users 602, the buddy lists 608 and personal information 610 (also referred to as user information) are uploaded to the private storage component 604, which stores and maintains the information. Additionally, respective users are able to modify their buddy lists and their personal information and again upload that information to the private storage component 604 wherein their previous information is then overwritten. Similarly, respective users are able to remove their information and/or themselves from the private storage component 604.

Figure 9:
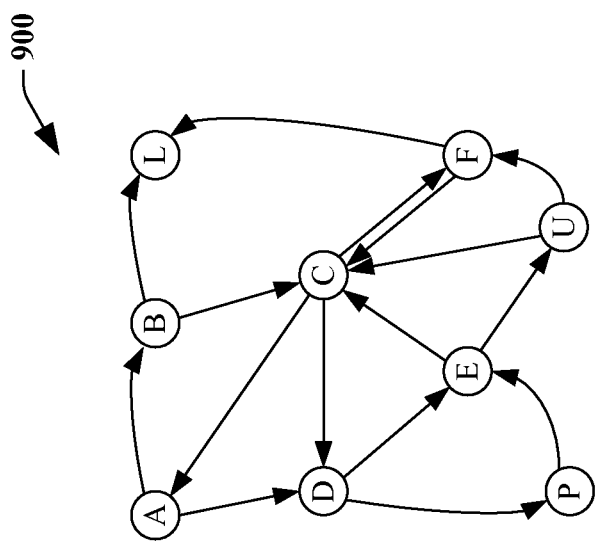
FIG. 9 illustrates an exemplary directed graph according to an aspect of the invention.

The private storage component 604 receives the personal information and buddy lists from the set of users 602. The private storage component 604 securely stores this information and does not make it publicly available. The private storage component 604 includes a graph generator 612 that generates a directed graph utilizing vertexes for respective users and arcs from respective users to members of their buddy list that are in the set of users 602. However, it is appreciated that alternate aspects of the invention can utilize other data-structure type forms, such as tables, relational databases, XML based databases and the like. The direction of the arcs in the directed graph indicates the type of relationship between pairs of users. Thus, for example, FIG. 9 illustrates at least a portion of an exemplary directed graph generated for system 600. The arc between users C and D indicates a relationship wherein C considers D a hero and D considers C a fan. It is appreciated that the arc between C and D would not exist if D did not consider C a fan or if C did not consider D a hero. The relationships, modeled by the arcs, also include a familiarity value. Since, as discussed above, users can disagree on familiarity values, the minimum value for a relationship is utilized. Employing the minimum of two declared familiarities results in a more accurate representation of a social opportunity along the respective arc. Thus, as another example, if C set a familiarity value of 7 and D set a familiarity value of 6, the minimum value, 6, is employed for the relationship between C and D. Additionally, such a scheme allows for either vertex of an arc to revise familiarity along the arc without the other vertex's knowledge and to affirmatively respond to possible abuses of an intra-relationship. Briefly referring to FIG. 4, it is appreciated that within a social network, egos exist, and as such it is significant to determine the extent to which P, Q can discover any discrepancy on their values for P→Q by employing the aforementioned mechanism. Without loss of generality, assume that P's value on the arc P→Q is greater than that of Q (e.g., P has a self-important view of his relationship with Q). In such scenarios, Q may not desire to have P learn of a discrepancy in familiarity value assigned to the arc—if Q does not care (as in the case of spammers), there is no issue.

As long as P makes queries for which P is not aware that Q is a good source, then P will not discover that Q has a lower view of their relationship. For P to be aware of the discrepancy, P would have to discover that Q is a good source on a subject (e.g., subject X) and for P or a fan of P to make a request for information on that subject. However, even if the discrepancy is discovered by P, Q can avoid potential conflicts (e.g., hurt feelings) by informing P that he or she simply forgot to enter P as a fan or subject X in Q's profile. Q can then update his or her profile to include the subject matter (e.g., subject X) and/or add P as a fan but not include or remove other subject matter which P likely is not aware of Q having. Additionally, in another aspect of the invention, Q can adjust his or her profile to limit P only to particular subject matter of which P knows Q is a good source of. Of course, since P knows Q, there is nothing preventing P from contacting Q by other means (e.g., phone, email . . . ) to obtain or request information. However, it is possible to limit fan's access to certain aspects of "myself" (e.g., certain attributes or information), which also facilitates fans corroboration of and trustworthiness of attributes and information entered by users.

Additionally, the relationship of P→Q implies that P is willing to corroborate the information entered by Q, which in reality may or may not be true. If this implication is not true, this failure only becomes relevant when a user enters a query for which Q is a good "match" (according to himself), otherwise the failure is irrelevant (e.g., it does not manifest itself in the world. Additionally, unless a user approaches P with a request for introduction to Q based on a referral path, Q's failure is again irrelevant.

Referring to FIG. 6 again, it is also appreciated that at least some members of a user's buddy list can be absent from the set of users and, therefore the directed graph. Alternately, a non member in a buddy list can simply be maintained in the directed graph without their entry of information. The private storage component 604 is typically implemented at a central location. Suitable encryption techniques can be used to properly encrypt the personal information and the graph.

The search engine 606 is operative to receive queries from the set of users 602 and return directed subgraphs to the set of users 602. The search engine 606 accesses the directed graph in the private storage component 604 and obtains appropriate information, which in turn becomes the query receipts. A query is generated by a respective user of the set of users 602. The query is parsed to obtain query information including, but not limited to information such as, a user requesting the query, an attribute and/or information requested familiarity limit and a query distance. The query distance is the number of arcs or vertices to which the query can extend to from the user to search for the information. The attribute and/or information requested can include information such as, person selling red convertible or person living in Chicago Ill. The familiarity limit sets a minimum value for searching the directed graph. If the familiarity limit is below a particular familiarity between two users, the search does not utilize that arc and therefore the relationship between those two users. The search is typically performed by employing a breadth first search of the directed graph starting at the vertex of the user requesting the query. On finding a match of the requested information, a subgraph, which is a directed graph illustrating the referral path or map to the desired information, is generated. The subgraph is then encoded according to the users along the subgraph such that the users are only able to access a portion of the subgraph.

Figure 10:
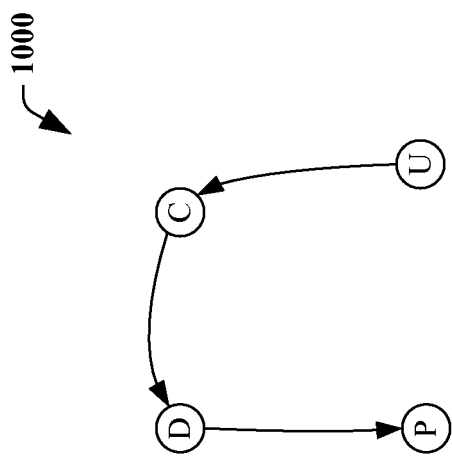
FIG. 10 illustrates an exemplary subgraph according to an aspect of the invention.

FIG. 10 depicts an exemplary subgraph 1000 of the directed graph of FIG. 9. For an exemplary query by user U that identifies user P as having the requested information, the subgraph 1000 is encrypted and returned to the user U. However, the user U is not able to view the whole subgraph 1000, but can only view the arc from users U to C. The user U can then send the subgraph 1000 to user C who can view the arc from users C to D, the next user in the referral path. Likewise, C can send the subgraph 1000 to user C who can view the arc from users D to P. The user P can then contact the user U with the requested information. It is appreciated that the subgraph returned provides navigational information towards the social information and/or opportunities requested, but not the actual information or opportunities requested.

It is also appreciated that the requested information received by a user as a result of system 600 should be relatively reliable. Fans of the user providing the requested information can be utilized to corroborate the requested information. For example, a query to find the best shuffleboard player in Chicago Ill. can, after following navigational information reveal a shuffleboard player in Chicago. However, the system 600 does not independently verify the accuracy of information entered, thus, it is possible that this person is not really the best shuffleboard player. Thus, a fan of the shuffle board player can be contacted to corroborate this information (e.g., the fan indicates that the shuffleboard player is a good shuffleboard player).

There are a few different possibilities for a user Q who is a fan of P regarding corroboration of information entered by P. A first case is when Q feels that the claim is false to the point of casting P in a bad light (e.g., P claims to be a psychic). In that case, Q can choose to stop considering P as a hero and modify Q's buddy list. A second case is when Q feels that the claim made by P is false, but not malicious (e.g., P is deluded about his shuffleboard game but is otherwise a swell fellow). Q would like to block requests to introduce P to his fans when they seek a great tennis player. Another case is when Q is willing to corroborate all statements made by P, but only to a subset of Q's fans. A last case occurs when Q is willing to corroborate subsets of statements made by P to subsets of his own, i.e Q's, fans. As stated above, the first case is resolved by Q removing P from Q's set of heroes. For the second case, Q can declare that P is a good fellow but is not a good tennis player on, for example, an about page. For the third and fourth cases, Q can provide corroboration information regarding P that adjusts the social connections that Q is willing to facilitate. Then, the directed graph can be further modified to include corroboration connections based on this corroboration information. The corroboration connections block requests from fans to some heroes. Thus, connections are maintained where Q is willing to facilitate and eliminated where Q is not willing to facilitate connections.

Figure 11:
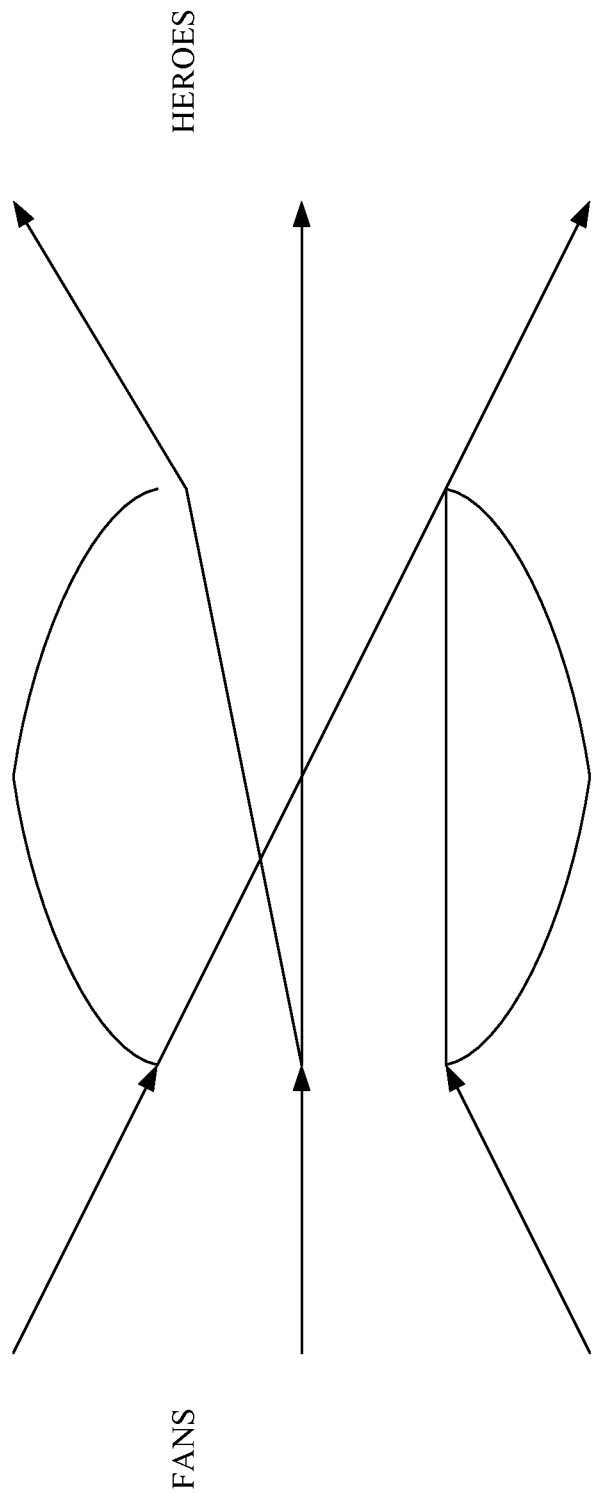
FIG. 11 illustrates connectivity based on corroboration information according to an aspect of the invention.

FIG. 11 illustrates connections based according to another aspect of the invention. Missing connections correspond to an unwillingness to connect fan(s) to hero(es). The set of users 602 (FIG. 6) can explicitly specify these connections and/or group fans and heroes into categories and then define connections between the categories is rather than between all the pairs of individuals in a pair of categories. The "very hard" category from above is not illustrated in FIG. 11, but can be implemented by subdividing information of P into sets by Q and then selecting which fans can have access to the respective sets of information through Q.

Figure 12:
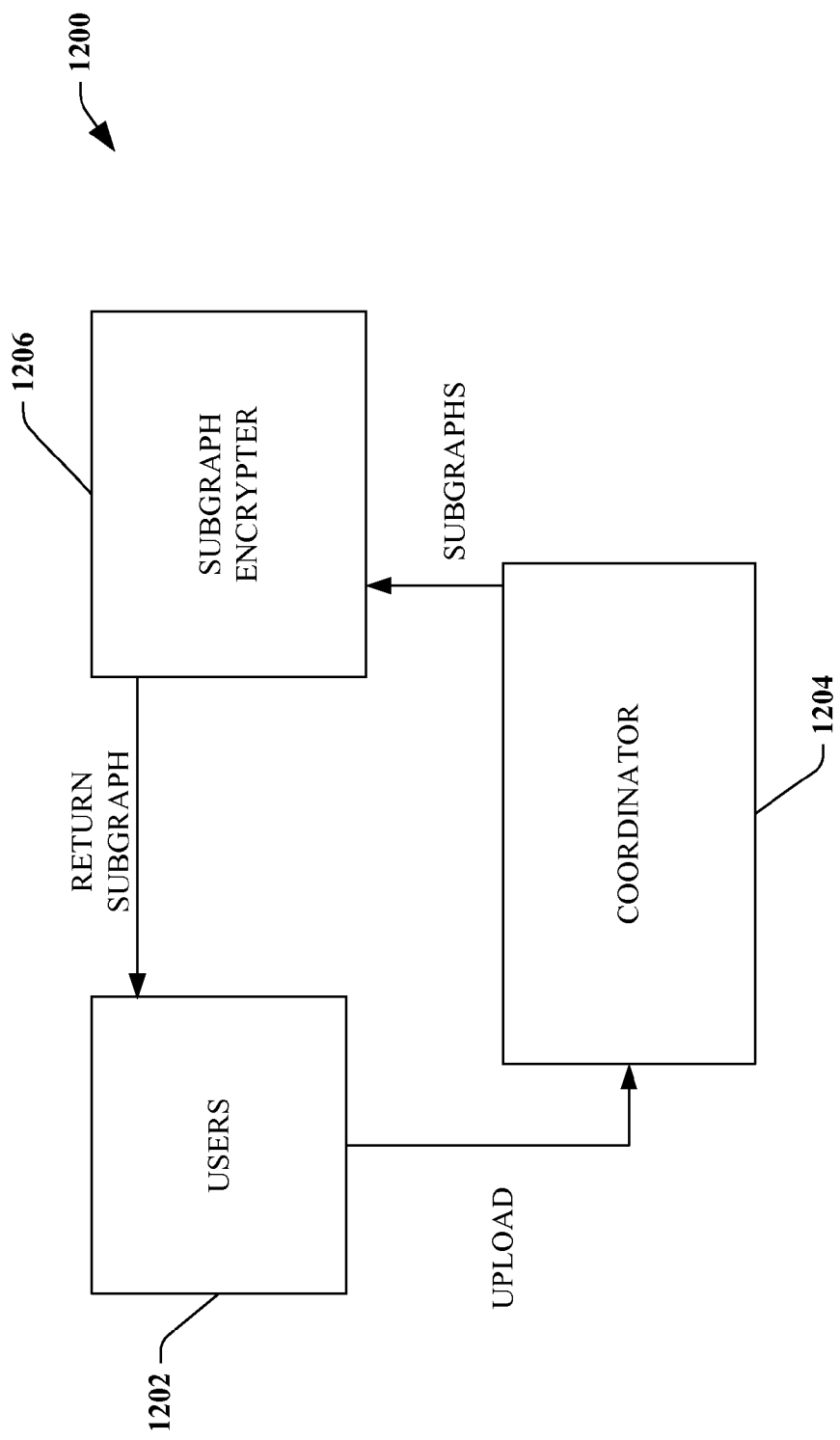
FIG. 12 is a block diagram illustrating a system for utilizing social information according to an aspect of the invention.

FIG. 12 is a block diagram illustrating a system 1200 for utilizing social information according to an aspect of the invention. The system 1200 comprises a set of users 1202, a subgraph encrypter component 1206 and a coordinator 1204. The system 1200 acts as a compass to guide users toward reliable social information and opportunities whilst maintaining privacy of the set of users 1202 by providing navigational information in response to a query.

The set of users 1202 are a number of persons or users that are members of the social network. Generally, the number of users in the system 1200 is relatively large. Respective users full out a "buddy list", which is a list of people they are willing to share their information with and/or to whom they are willing to permit access to their information. For respective members (buddies) of the buddy list, users enter or provide a name, familiarity or degree of familiarity with the member and indicate whether the member is a fan, a hero or both. The name can be a full name or a username. The familiarity is of a range of possible values (e.g., 1 to 10 or 1 to 100) where, typically, a higher number indicates a greater degree of familiarity. The member is indicated as a hero if the user is willing to contact this member for information, a fan if the user is willing to be contacted by this member for information or both if the user is willing to contact and to be contacted by this member. Additionally, a fan should be willing to corroborate personal information entered by the user although this is not necessarily valid. For example, individual A declares individual F as a fan if A would like F to corroborate A's personal information. Whether individual F actually satisfies that role is up to his/her discretion (e.g., manifested by declaring A as a hero).

It is appreciated that people can have differing views on their personal relationships. Thus, a user can view a member of the user's buddy list as being a hero with a high degree of familiarity but that member can view that user as being unfamiliar and not a fan and can fail to include that user on the member's own buddy list. Thus, entry of a buddy list does not generally require checking and/or verification to determine if, for example, other users agree.

Then, respective users enter personal information, referred to as profiles about themselves utilizing predefined categories and attributes. The categories and predefined attributes permit consistency in the personal information for the set of users 602. Additionally, the categories and predefined attributes can be set with default or typical values to ease the personal information entering process. It is appreciated that different users can provide or not provide varying amounts of information within their personal information. Thus, users are permitted to enter as much or as little personal information as they prefer.

One suitable approach to entering the personal information is to employ a generic page or template of a home page and that assists entering their personal information. A number of attributes should be selectable to increase the ease of entering the personal information. For example, a user may be able to select an item from a drop down list for a particular attribute.

As another example, a user may be able to select "not applicable" for attributes that user does not wish to provide information for. Other suitable approaches can be employed and still be in accordance with the present invention. Additionally, the set of users 1202 can enter corroboration information to determine which fans of respective users have access to which heroes of respective users. It is appreciated that users can provide as little or as much corroboration information as they are inclined to. For example, a user can provide no corroboration information implying that all fans of the user can be connected through that user to all heroes of that user. The corroboration information can be entered or provided via an about page or template.

Once entered, the personal information, buddy lists and corroboration information are uploaded to the coordinator 1204. The information can be uploaded on a user by user case and can also be updated. Also, the personal information and corroboration information can be encrypted. Additionally, respective users are able to modify their buddy lists, corroboration information and their personal information and again upload that information to the coordinator 1204.

Figure 13:
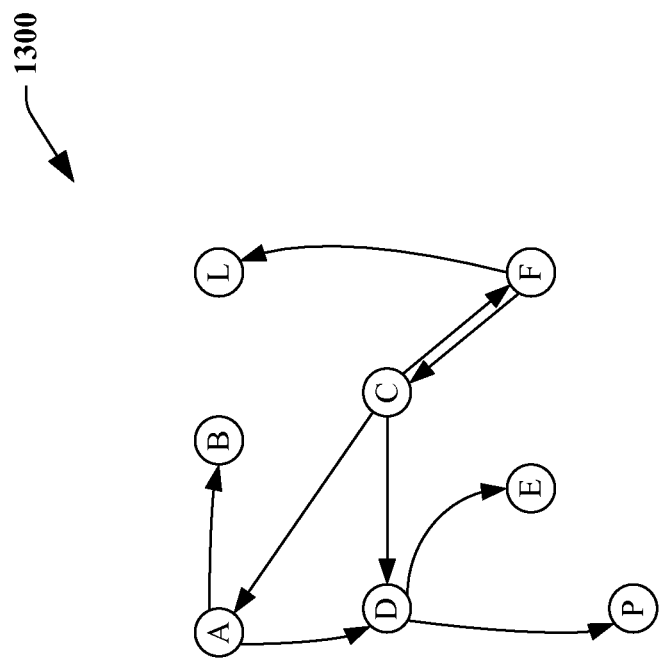
FIG. 13 illustrates a subgraph for a user with a subgraph distance of two according to an aspect of the invention.

The coordinator 1204 receives the personal information, corroboration information and buddy lists from the set of users 1202 and generates subgraphs. Generally, a subgraph is generated for a respective user according to a subgraph distance. The user for which a subgraph is generated can be referred to as a base user. The subgraph distance refers to a distance or size of the subgraph and is similar to the distance used in searching. The subgraph distance limits the distance for which a user can submit queries. An exemplary subgraph distance value is two or three, however other suitable values can be utilized. FIG. 13 is a diagram of a subgraph 1300 generated for user C of FIG. 1 with a subgraph distance of two. It can be seen that the subgraph 1300 of FIG. 13 is smaller than the graph 100 of FIG. 1. The subgraphs are generated similar to how the graph in system 600 of FIG. 6 is generated, except that the subgraphs are limited to the subgraph distance and are centered at respective users.

The subgraph encrypter 1206 receives the subgraphs from the coordinator 1204 and encrypts the subgraphs according to the set of users 1202. The encrypted subgraphs are then provided to the set of users 1202. A subgraph for a respective user is encrypted specifically for that user. The respective users of the set of users 1202 then receive their unique encrypted subgraph that is typically stored on local users' systems.

The users can then perform queries and obtain navigation information from the encrypted subgraphs similar to that in system 600 of FIG. 6. A query is generated by a respective user of the set of users 602. A query typically includes information such as, a user requesting the query, an attribute and/or information requested, a familiarity limit and a query distance, although the user requesting the query is not generally required. The query distance is the number of arcs or vertices to which the query can extend to from the user to search for the information. The query distance is, necessarily, limited to the subgraph distance, thus, for a subgraph having a subgraph distance of 2, the query distance can not exceed 2. The attribute and/or information requested can include information such as, person selling red convertible or person living in Chicago Ill. The familiarity limit sets a minimum value for searching the directed graph. If the familiarity limit is below a particular familiarity between two users, the search does not utilize that arc and therefore the relationship between those two users. The search is performed employing a breadth first search of the subgraph starting at the vertex of the user requesting the query (e.g., the user that generated the query). On finding a match of the requested information, navigational information is provided for the user. It is appreciated that the navigational information facilitates finding and/or obtaining the social information and/or opportunities requested, but not the actual information or opportunities requested.

Figure 14:
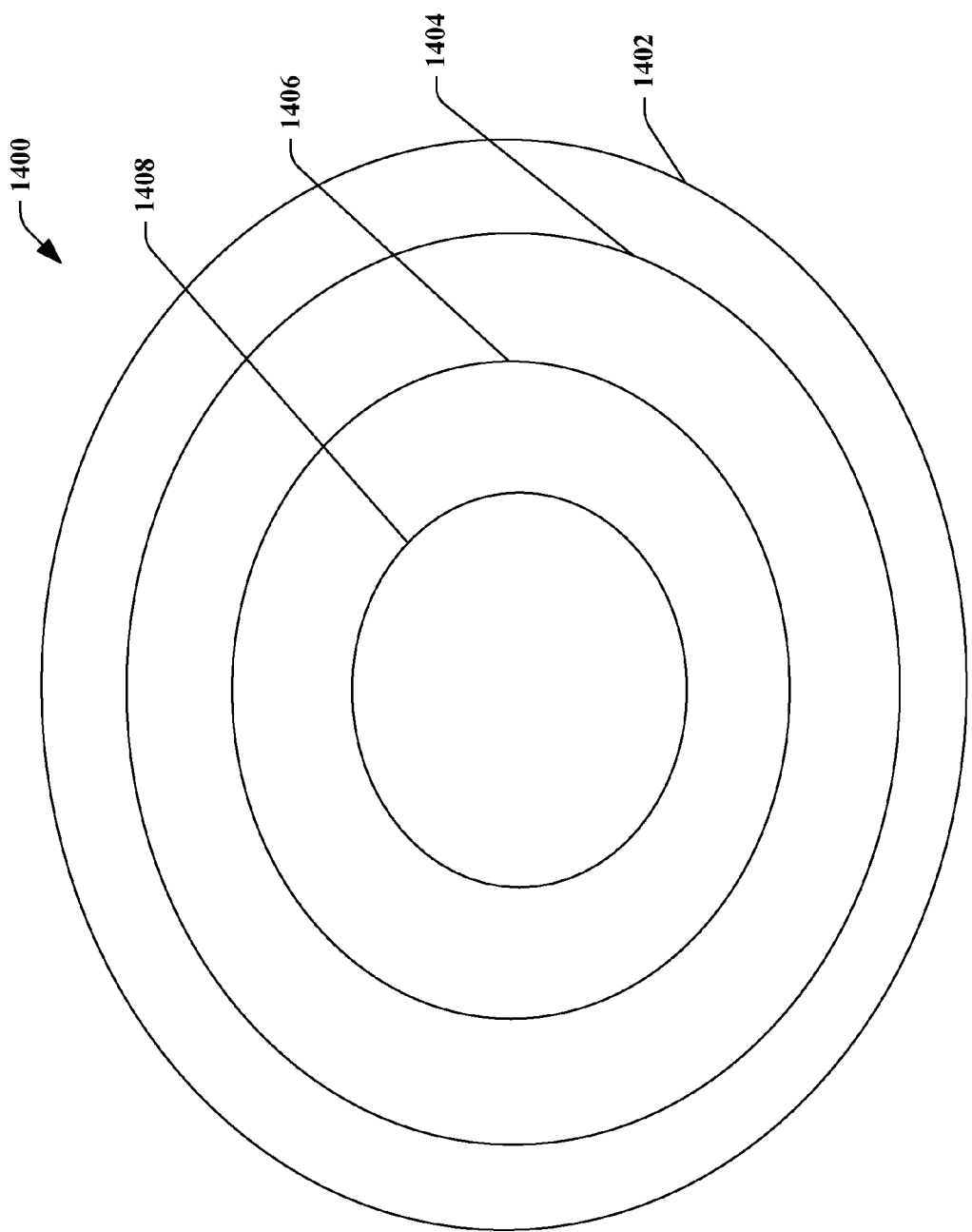
FIG. 14 is a diagram of a data packet generated in response to a query according to an aspect of the invention.

Turning now to FIG. 14, a block diagram of a data packet 1400 generated in response to a user query in accordance with an aspect of the present invention is depicted. The data packet 1400 employs a babushka/wrapper concept with respect to security wherein various portions of the data packet are respectively secured (e.g., encryption, password protected . . . ) such that only an individual or entity authorized to access the portion can. Thus, although the data packet may contain all data regarding a given path, exposure of portions of the data is selective relative to a predefined authorization/authentication scheme. As discussed supra, a typical response to a user query is to generate a query receipt. According to an aspect of the present invention, the query receipt comprises a data packet 1400, which is encrypted with layers that controllable expose to users depending upon their place along the path to desired information. The data packet 1400 can include can include all information regarding the path but regulate access to the data in order to maintain privacy in accordance with the subject invention. Generally, the data packet 1400 is provided to the user that initiated the query and is passed along a referral path in order to possibly obtain the desired information.

The data packet 1400 is depicted as comprising encrypted layers including a first layer 1402, a second layer 1404, a third layer 1406 and a core layer 1408. It is appreciated that alternate aspects of the present invention can have more or less layers in the data packet 1400 and still be in accordance with the present invention. The first layer 1402 is also referred to as an outer layer and is accessible by the user that initiated the query. Typically, the user unwraps or obtains the information contained in the outer layer by employing a key assigned to the user by a system managing the social network. The information obtained includes at least a next user along the referral path. Additionally, the information can also optionally include a length of the referral path and other similar information. The user then sends the data packet 1400 to a second user on the referral path.

The second user can access the second layer 1404 by means of a key supplied the system. A third user in the referral path is obtained from the second layer and the second user can pass the data packet 1400 to the third person. Similarly, the third user is operative to access the third layer 1406 by means of a key supplied the system. A final user is obtained from the third layer 1406 and the data packet 1400 is then passed to the final user.

At this point, the data packet 1400 only contains the core layer 1408 (It is to be appreciated that the subject invention is not limited to two paths). The core layer 1408 comprises the requested information and identifies the user requesting the information (e.g., by means of a key supplied by the system). The final user can decide not to provide the requested information to the user that requested the information. Otherwise, the final user sends the desired information to the requested user. The desired information can be encrypted so as to only permit access by the requesting user.

Figure 15:
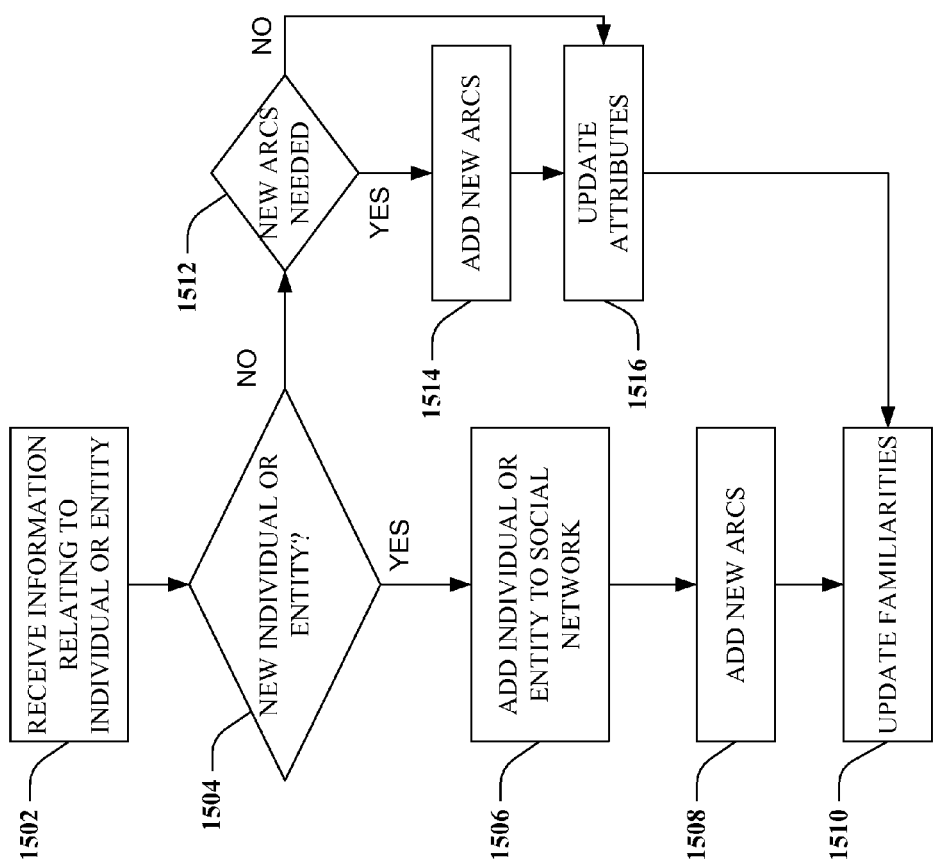
FIG. 15 is a flow diagram illustrating a method of modifying a social network according to an aspect of the invention.
Figure 16:
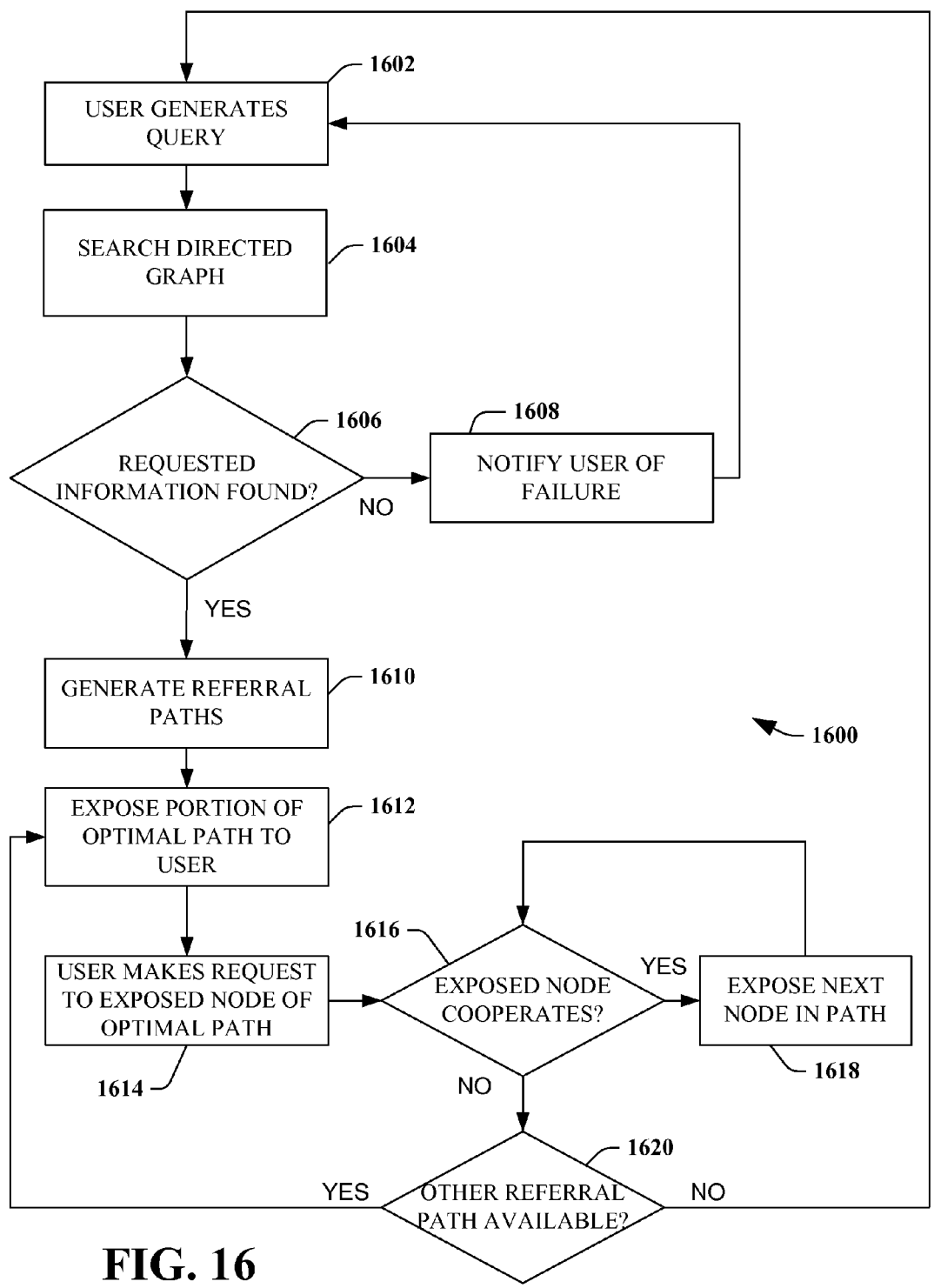
FIG. 16 is a flow diagram illustrating a method for searching a social network according to an aspect of the invention.

In view of the exemplary systems shown and described above, methodologies that may be implemented in accordance with the present invention will be better appreciated with reference to the flow diagrams of FIGS. 15-16. While, for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

FIG. 15 is a flow diagram depicting a method 1500 generating and/or modifying a social network of utilizing a social network according to an aspect of the invention. The method 1500 generates a directed graph that represents social information and relationships for individuals and/or entities.

Personal information is received relating to an individual or entity at 1502. The personal information includes attributes, corroboration information and relationships (e.g., buddy list) for that individual or entity. The personal information includes, but is not limited to, geographic information, hobbies, favorite foods, restaurants, movies, items for trade, items for sale and the like. The relationship information indicates which existing individuals or entities of the network the individual or entity has a relationship with, specifies the type of relationship (e.g., fan, hero or both) and designates a familiarity for the respective relationships. Then, a determination is made as to whether the individual or entity is new to the social network at 1504 by, for example, searching the social network for the individual or entity.

If the individual or entity is new, the individual or entity is added to the social network, represented as the directed graph, as a new node or vertex at 1506. The new node is added along with the personal information received at 1502. The attributes can be organized in a hierarchal manner according to pre-defined categories so as to facilitate searches of the information. Subsequently, new arcs are added to the directed graph at 1508 from the new node to other existing nodes according to the relationship information previously received. The directionality of the arcs is obtained by the types of the relationship being represented by the arcs. Then, the familiarities are assigned or updated for the arcs according to the received information at 1510. Generally, a higher familiarity indicates a greater degree of familiarity between a pair individuals and/or entities. However, if each of the individuals or entities of the pair has indicated differing familiarities, the minimum of the two can be assigned to the respective arc.

At 1504, if the individual or entity is not new to the social network, a determination is then made at 1512 as to whether new arcs are to be added to the directed graph (e.g., indicating that relationships have changed for the individual or entity). If new arcs are needed, the new arcs are added at 1514 from the node representing the individual or entity to existing nodes according to the received relationship information. Additionally, the method 1500 can remove existing arcs according to the relationship information. Then, the attributes for the individual or entity are updated at 1516 by adding, modifying and/or deleting information about the individual or entity. Finally, familiarities can be updated at 1510, as described above, according to the relationship information received for the individual or entity.

Prior to the personal information being received at 1502, individuals or entities (e.g., users) enter their information in accordance with a number of suitable approaches that have previously been described herein, but omitted for brevity.

Additionally, the method is described as representing the social network as the directed graph; however, it is appreciated that the social network can be represented with other suitable data structures or representations in alternate aspects of the invention, also previously described.

In an alternate aspect of the invention, a subgraph is generated for respective members of the social network instead of a single directed graph of the complete social network. The subgraphs collectively comprise substantially the same information as the directed graph. However, the subgraphs originate at a base node (e.g., the individual or entity to which the subgraph is generated) and extend a number of degrees referred to as a subgraph limit.

FIG. 16 is a flow diagram illustrating a method 1600 of searching a social network according to an aspect of the invention. The method facilitates maintaining privacy of personal information within a database search environment, and also can permits queries for purposes of locating personal attribute information of an unknown person, and allow an originator of a query to evaluate a level of trust associated with an individual identified by a query.

In accordance with the method 1600, a user query (e.g., natural language based query) is generated at 1602. The user is an individual or entity that is a member of the social network. The query can then be parsed into terms germane to the query such as, for example indexable elements and/or atomic pairs. Of course, it is appreciated that the subject invention is applicable to other suitable types of querying schemes. The query typically includes requested information, minimum familiarity and a search distance or limit. A directed graph, representing the social network, is searched at 1604 for the requested information. The directed graph is searched via a breadth first search from the user's node extending through nodes connected to the user's node according to the minimum familiarity and the search limit for the requested information. Thus, the search at 1604 only proceeds through arcs having at least the minimum familiarity and within the search limit (e.g., number of arcs traversed). If the requested information is not obtained or identified at 1606, the user is notified of the failure at 1608. The user can then revise the parameters of query (e.g., expanding the search terms, lowering the minimum familiarity, increasing the search distance . . . ) and re-enter the new or revised query at 1602.

If the requested information is identified at 1606, the method 1600 then generates one or more referral paths to the information at 1610. The one or more referral paths are paths from the user's node towards a node that has the requested information, referred to as a final node. An optimal or "best" path of the one or more referral paths can be determined according to the familiarities of the arcs to the requested information and the number of arcs to the information (e.g., distance). Then, a portion of the optimal path is exposed to the user at 1612. Generally, the portion exposed or exposed node is initially a first node along the path. The user then makes a request to the exposed node at 1614 to expose a next node and or the requested information. The exposed node generally can only provide the requested information if it is the final or last node of the referral path. If the exposed node cooperates at 1616, the next node of the referral path is exposed to the user at 1618. The method then continues at 1616 once again wherein the next exposed node decides whether or not to cooperate. If the exposed node refuses to cooperate at 1616, a determination is made as to whether another referral path is available at 1620. If there is another referral path of the one or more referral paths remaining, the method continues at 1612 where the optimal path is now the best or optimal of the paths remaining. Otherwise, if no referral paths remain, the user can then revise the parameters of query (e.g., expanding the search terms, lowering the minimum familiarity, increasing the search distance . . . ) and enter a revised or new query at 1602.

In an alternative aspect of the invention, a subgraph for the user is searched instead of the directed graph. Subgraphs for members of the social network exist wherein the subgraphs collectively comprise substantially the same information as the directed graph. However, the subgraphs originate at a base node (e.g., the individual or entity to which the subgraph is generated) and extend a number of degrees referred to as a subgraph limit.

Figure 17:
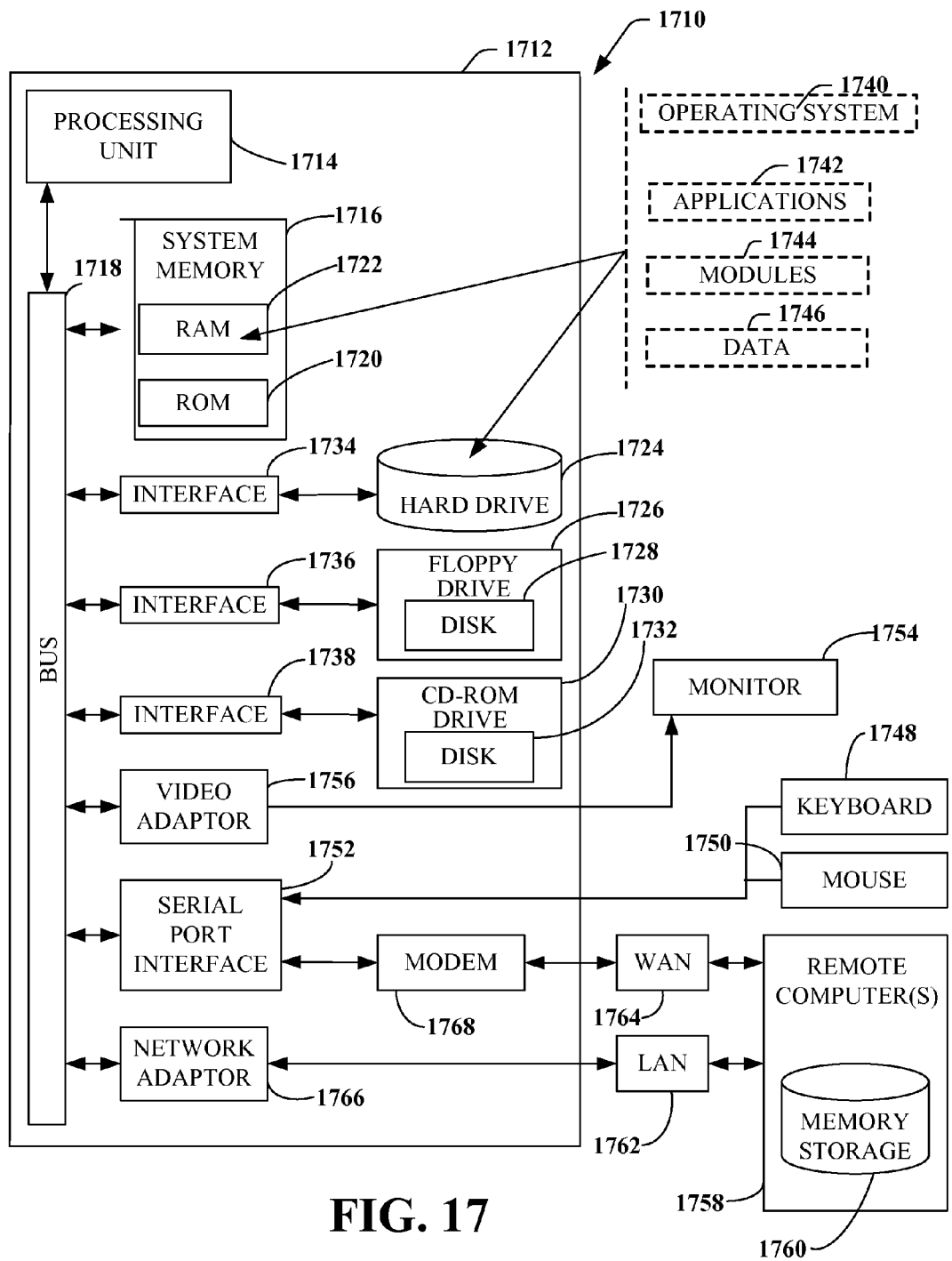
FIG. 17 is a schematic block diagram of an exemplary operating environment for a system configured in accordance with the present invention.

In order to provide additional context for various aspects of the present invention, FIG. 17 and the following discussion are intended to provide a brief, general description of one possible suitable computing environment 1710 in which the various aspects of the present invention may be implemented. It is to be appreciated that the computing environment 1710 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 17 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 17, an exemplary environment 1710 for implementing various aspects of the invention includes a computer 1712, including a processing unit 1714, a system memory 1716, and a system bus 1718 that couples various system components including the system memory to the processing unit 1714. The processing unit 1714 may be any of various commercially available processors. Dual microprocessors and other multi-processor architectures also can be used as the processing unit 1714.

The system bus 1718 may be any of several types of bus structure including a memory bus or memory controller, a peripheral bus, and a local bus using any of a variety of commercially available bus architectures. The computer memory 1716 includes read only memory (ROM) 1720 and random access memory (RAM) 1722. A basic input/output system (BIOS), containing the basic routines that help to transfer information between elements within the computer 1712, such as during start-up, is stored in ROM 1720.

The computer 1712 may further include a hard disk drive 1724, a magnetic disk drive 1726, e.g., to read from or write to a removable disk 1728, and an optical disk drive 1730, e.g., for reading a CD-ROM disk 1732 or to read from or write to other optical media. The hard disk drive 1724, magnetic disk drive 1726, and optical disk drive 1730 are connected to the system bus 1718 by a hard disk drive interface 1734, a magnetic disk drive interface 1736, and an optical drive interface 1738, respectively. The computer 1712 typically includes at least some form of computer readable media. Computer readable media can be any available media that can be accessed by the computer 1712. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 1612. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 1722, including an operating system 1740, one or more application programs 1742, other program modules 1744, and program non-interrupt data 1746. The operating system 1740 in the computer 1712 can be any of a number of commercially available operating systems.

A user may enter commands and information into the computer 1712 through a keyboard 1748 and a pointing device, such as a mouse 1750. Other input devices (not shown) may include a microphone, an IR remote control, a joystick, a game pad, a satellite dish, a scanner, or the like. These and other input devices are often connected to the processing unit 1714 through a serial port interface 1752 that is coupled to the system bus 1718, but may be connected by other interfaces, such as a parallel port, a game port, a universal serial bus ("USB"), an IR interface, etc. A monitor 1754, or other type of display device, is also connected to the system bus 1718 via an interface, such as a video adapter 1756. In addition to the monitor, a computer typically includes other peripheral output devices (not shown), such as speakers, printers etc.

The computer 1712 may operate in a networked environment using logical and/or physical connections to one or more remote computers, such as a remote computer(s) 1758. The remote computer(s) 1758 may be a workstation, a server computer, a router, a personal computer, microprocessor based entertainment appliance, a peer device or other common network node, and typically includes many or all of the elements described relative to the computer 1712, although, for purposes of brevity, only a memory storage device 1760 is illustrated. The logical connections depicted include a local area network (LAN) 1762 and a wide area network (WAN) 1764. Such networking environments are commonplace in offices, enterprise-wide computer networks, intranets and the Internet.

When used in a LAN networking environment, the computer 1712 is connected to the local network 1762 through a network interface or adapter 1766. When used in a WAN networking environment, the computer 1712 typically includes a modem 1768, or is connected to a communications server on the LAN, or has other means for establishing communications over the WAN 1764, such as the Internet. The modem 1768, which may be internal or external, is connected to the system bus 1718 via the serial port interface 1752. In a networked environment, program modules depicted relative to the computer 1712, or portions thereof, may be stored in the remote memory storage device 1760. It will be appreciated that the network connections shown are exemplary and other means of establishing a communications link between the computers may be used.

Figure 18:
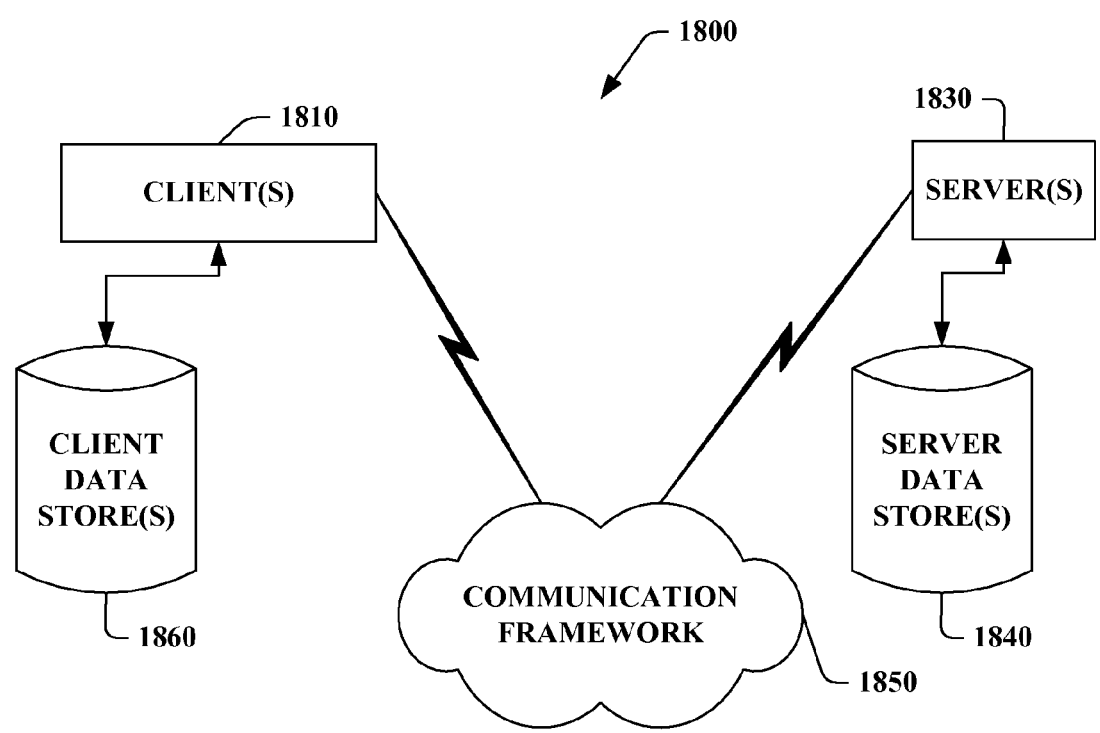
FIG. 18 is a schematic block diagram of an exemplary communication environment in accordance with the present invention.

FIG. 18 is a schematic block diagram of a sample computing environment 1800 with which the present invention can interact. The system 1800 includes one or more client(s) 1810. The client(s) 1810 can be hardware and/or software (e.g., threads, processes, computing devices). The system 1800 also includes one or more server(s) 1830. The server(s) 1830 can also be hardware and/or software (e.g., threads, processes, computing devices). The servers 1830 can house threads to perform transformations by employing the present invention, for example. One possible communication between a client 1810 and a server 1830 may be in the form of a data packet adapted to be transmitted between two or more computer processes. The system 1800 includes a communication framework 1850 that can be employed to facilitate communications between the client(s) 1810 and the server(s) 1830. The client(s) 1810 are operably connected to one or more client data store(s) 1860 that can be employed to store information local to the client(s) 1810. Similarly, the server(s) 1830 are operably connected to one or more server data store(s) 1840 that can be employed to store information local to the servers 1830.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A search system comprising:
   a storage component that stores a data structure representing a directed graph comprising a plurality of nodes and a plurality of arcs, each node of the plurality of nodes representing one individual of a social network comprised of a plurality of individuals; and
   a search engine that receives a user query that includes a query distance, the query distance being a number of arcs to which the user query is able to extend and indicative of a number of arcs able to connect nodes in a referral path, the search engine determining the referral path based at least in part on the query distance, wherein the referral path extends from a source node of the data structure to a destination node of the data structure and includes a number of arcs connecting nodes of the referral path, a number of arcs of the referral path being no greater than the query distance.

2. The system of claim 1, wherein the storage component stores attributes in a plurality of profiles that are associated respectively with individuals of the social network, and wherein attributes for at least one profile are at least partially directly input by an individual represented by the at least one profile.

3. The system of claim 1, wherein the storage component stores attributes in a plurality of profiles that are associated respectively with individuals of the social network, and wherein attributes for at least one profile are at least partially obtained via data scavenging.

4. The system of claim 1, the referral path including at least one intermediate node between the source node and the destination node, a first of the at least one intermediate node of the referral path being viewable by a user that submitted the user query and remaining nodes of the referral path after the first of the at least one intermediate node being hidden from the user.

5. The system of claim 4, at least one node of the at least one intermediate node within the referral path controlling downstream exposure of a remaining portion of the path from the at least one node of the at least one intermediate node to the destination node.

6. The system of claim 1, wherein the storage component stores a plurality of profiles, each profile being associated with a respective individual of the plurality of individuals comprising the social network and having a buddy list that comprises a member-name list of other individuals of the social network with which the respective individual has direct relationships and having at least one portion selected from a set of portions comprising a first portion indicating that the respective individual may contact another individual of the social network and a second portion indicating that the respective individual may be contacted by another individual of the social network.

7. The system of claim 6, wherein at least one member-name from the buddy list of a profile for a respective individual of the plurality of individuals comprising the social network is assigned a familiarity value by the respective individual having the corresponding profile, and wherein the familiarity value indicates a degree of familiarity between the respective individual associated with the profile comprising the buddy list and at least one other individual of the plurality of individuals comprising the social network corresponding to the at least one member-name from the buddy list.

8. The system of claim 7, wherein a first profile for a first individual of the plurality of individuals comprising the social network includes a first familiarity value for a member-name corresponding to a second individual of the plurality of individuals and a second profile for the second individual includes a second familiarity value for a member-name corresponding to the first individual, the first and second familiarity values being different, wherein the query includes a familiarity limit, and wherein the search engine determines the referral path based at least in part on the familiarity limit and at least in part on at least one of the first and the second familiarity values.

9. A query method utilizing a social network, the method comprising:
   storing a data structure representing a directed graph comprising a plurality of nodes and a plurality of arcs, each node of the plurality of nodes representing one individual of a social network comprised of a plurality of individuals;

receiving a user query that includes a query distance, the query distance being a number of arcs to which the user query is able to extend and indicative of a number of arcs able to connect nodes in a referral path; and performing a social network-based search of the data structure to determine the referral path from a source node of the query to a destination node based at least in part on the query distance.

10. The method of claim 9, the referral path including at least one intermediate node between the source node and the destination node, further comprising:

exposing a first of the at least one intermediate node of the referral path as being viewable by a user that submitted the user query; and hiding remaining nodes of the referral path after the first of the at least one intermediate node from the user.

11. The method of claim 10, further comprising:

controlling, by at least one node of the at least one intermediate node within the referral path, downstream exposure of a remaining portion of the path from the at least one node of the at least one intermediate node to the destination node.

12. The method of claim 9, further comprising:

storing a plurality of profiles, each profile being associated with a respective individual of the plurality of individuals comprising the social network and having a buddy list that comprises a member-name list of other individuals of the social network with which the respective individual has direct relationships and having at least one portion selected from a set of portions comprising a first portion indicating that the respective individual may contact another individual of the social network and a second portion indicating that the respective individual may contacted by another individual of the social network.

13. The method of claim 12, further comprising assigning a familiarity value to at least one member-name from the buddy list of a profile of the plurality of profiles by a respective individual associated therewith, and wherein the familiarity value indicates a degree of familiarity between the respective individual associated with the profile comprising the buddy list and at least one other individual of the plurality of individuals comprising the social network corresponding to the at least one member-name from the buddy list.

14. The method of claim 13, further comprising determining a familiarity value between a first profile and a second profile by selection of a minimum of a first familiarity value between the first profile and the second profile assigned by an individual associated with the first profile and a second familiarity value between the first profile and the second profile assigned by an individual associated with the second profile.

15. A query system comprising:

one or more processors;

one or more computer readable media maintaining instructions that, when executed by the one or more processors, cause the one or more processors to perform acts comprising:

storing a data structure representing a directed graph comprising a plurality of nodes and a plurality of arcs, each node of the plurality of nodes representing one individual of a social network comprised of a plurality of individuals;

receiving a user query that includes a query distance, the query distance being a number of arcs to which the user query is able to extend and indicative of a number of arcs able to connect nodes in a referral path; and performing a social network-based search of the data structure to determine the referral path from a source node of the data structure to a destination node of the data structure based at least in part on the query distance.

16. The system of claim 15, the acts further comprising:

parsing a familiarity limit from the query; and omitting, from the social network search, an arc of the plurality of arcs having a familiarity value, assigned by one of the individuals represented by a node connected to the arc, that is below the familiarity limit.

17. The system of claim 1, wherein each arc of the plurality of arcs includes information-flow directionality and extending between a pair of nodes, wherein the information-flow directionality indicates that a first member corresponding to a first node of the pair of nodes requests information from a second member corresponding to a second node of the pair of nodes.

18. The method of claim 14, further comprising receiving a familiarity limit, wherein the search engine determines the referral path based at least in part on the familiarity limit and at least in part on at least one of the first and the second familiarity values.

* * * * *